United States Patent [19]
Motoyama et al.

[11] Patent Number: 5,818,357
[45] Date of Patent: Oct. 6, 1998

[54] CHAIR WITH A SUPPLEMENTAL KEYBOARD AND A KEYBOARD SYSTEM

[75] Inventors: Hideyuki Motoyama; Seiichi Iwasa, both of Kawasaki, Japan

[73] Assignee: Fujitsu Limited, Kawasaki, Japan

[21] Appl. No.: 959,104

[22] Filed: Oct. 9, 1992

[30] Foreign Application Priority Data

Oct. 14, 1991 [JP] Japan ................................. 3-264823

[51] Int. Cl.⁶ ................................................ H03K 17/94
[52] U.S. Cl. ................................ 341/20; 341/21; 341/22; 400/471.2; 400/473; 364/189; 345/168
[58] Field of Search ............... 345/167–8; 400/472–473; 364/188–89, 709.12; 341/20–23

[56] References Cited

U.S. PATENT DOCUMENTS

| | | | |
|---|---|---|---|
| 4,378,553 | 3/1983 | McCall | 340/365 R |
| 4,689,761 | 8/1987 | Yurchenco | 364/708 |
| 4,913,573 | 4/1990 | Retter | 400/489 |
| 4,917,516 | 4/1990 | Retter | 400/489 |
| 4,949,080 | 8/1990 | Mikan | 340/711 |
| 5,122,786 | 6/1992 | Rader | 341/22 |
| 5,270,709 | 12/1993 | Niklshacher | 341/22 |
| 5,323,153 | 6/1994 | Sonobe et al. | 341/20 |

FOREIGN PATENT DOCUMENTS

| | | |
|---|---|---|
| 0 251 643 | 1/1988 | European Pat. Off. . |
| 0 264 785 | 4/1988 | European Pat. Off. . |
| 0 326 102 | 8/1989 | European Pat. Off. . |
| 33 08 818 | 9/1984 | Germany . |

*Primary Examiner*—Jeffery Hofsass
*Attorney, Agent, or Firm*—Staas & Halsey

[57] ABSTRACT

A chair having keyboard halves arranged in the armrests. The keys in the keyboard halves can be operated by left and right hands, respectively. The keyboard provided in the chair can be used as a supplemental keyboard in a keyboard system comprising a main keyboard for inputting data to an information processing apparatus. The main keyboard has full keys and the supplemental keyboard has keys identical to at least a part of the keys of the main keyboard for inputting data to the information processing apparatus parallel to the main keyboard. An operator can alternatively use the main and the supplemental keyboard depending on body position.

25 Claims, 21 Drawing Sheets

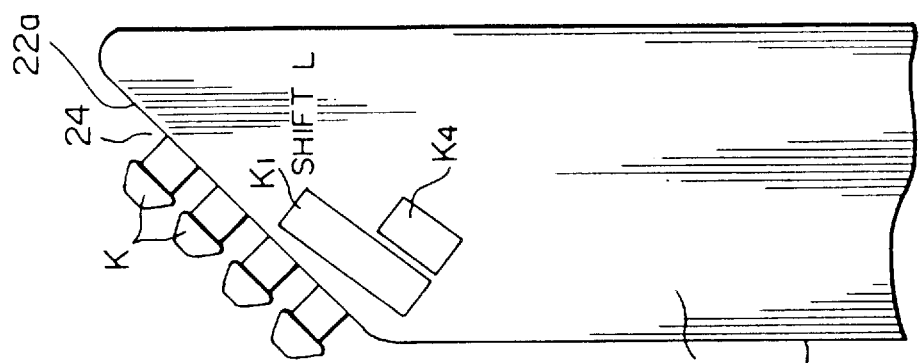
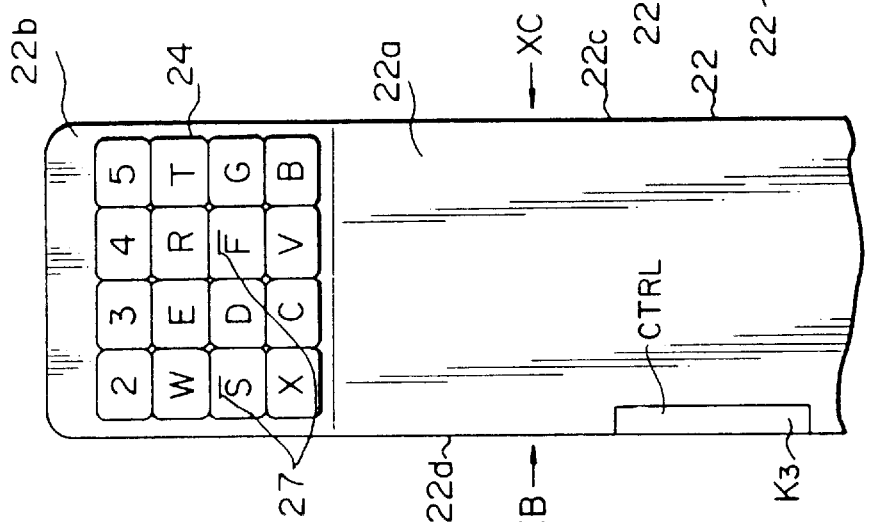
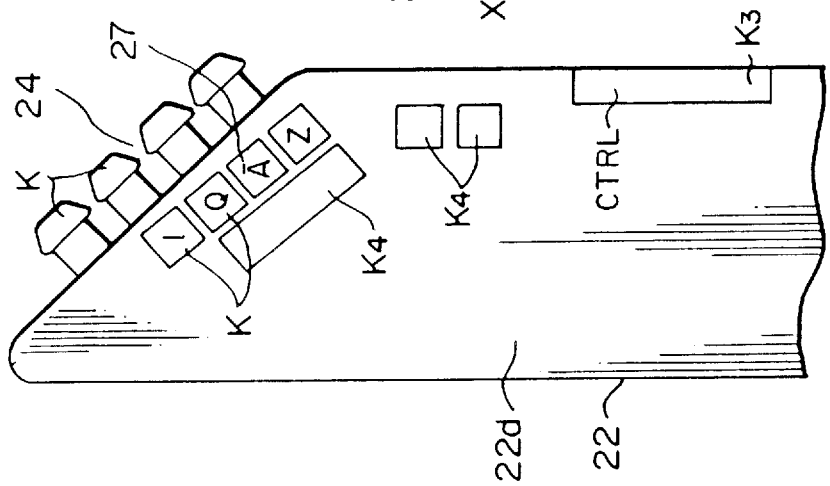

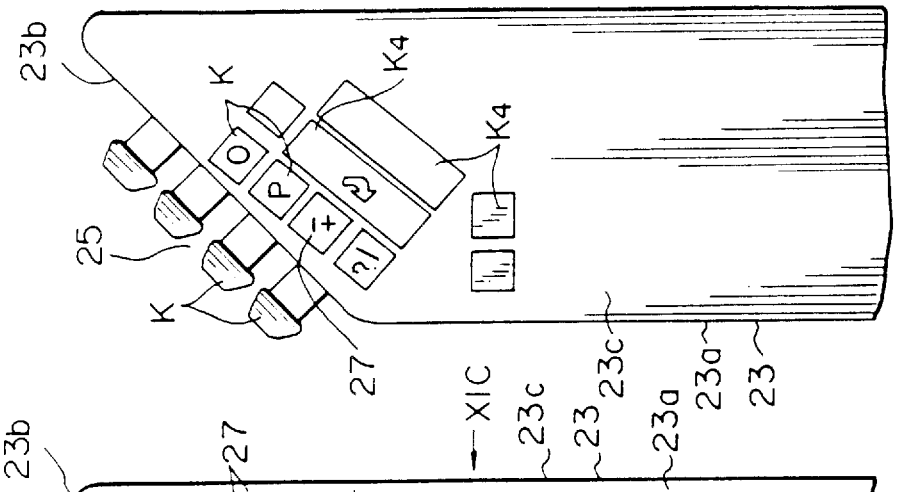
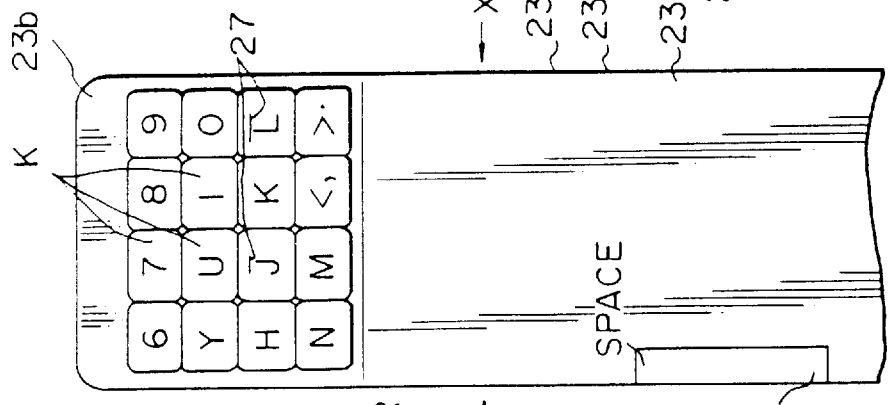
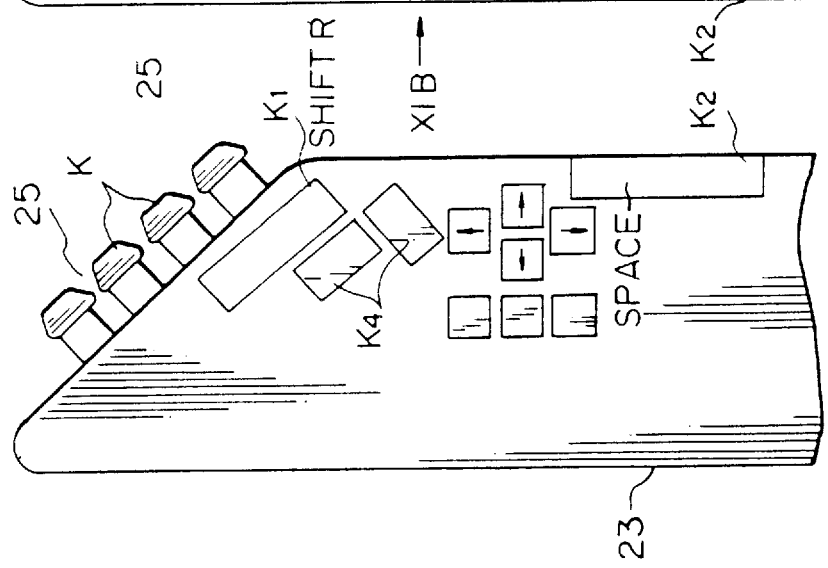

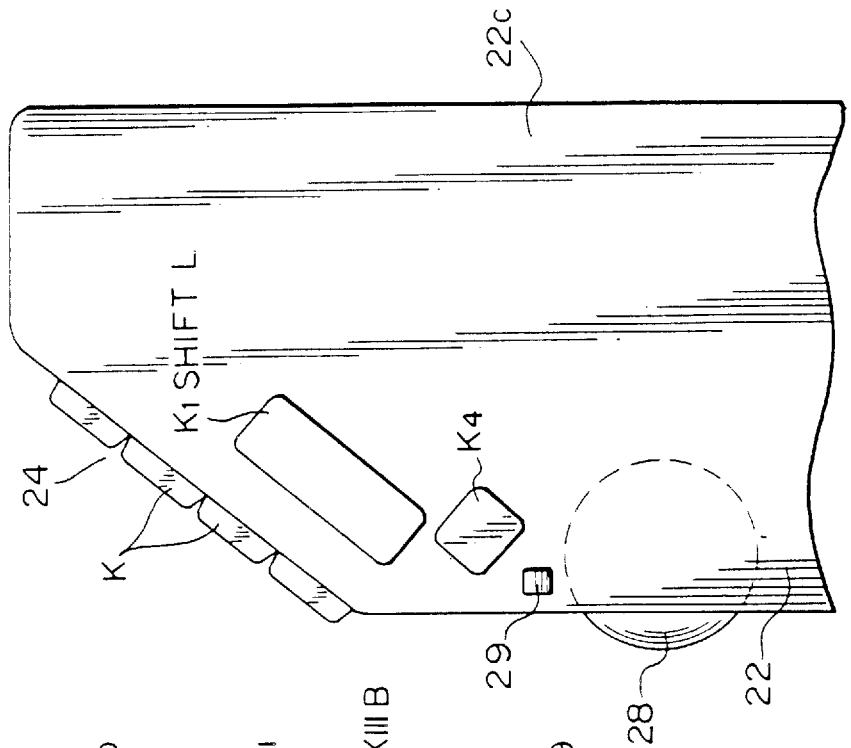
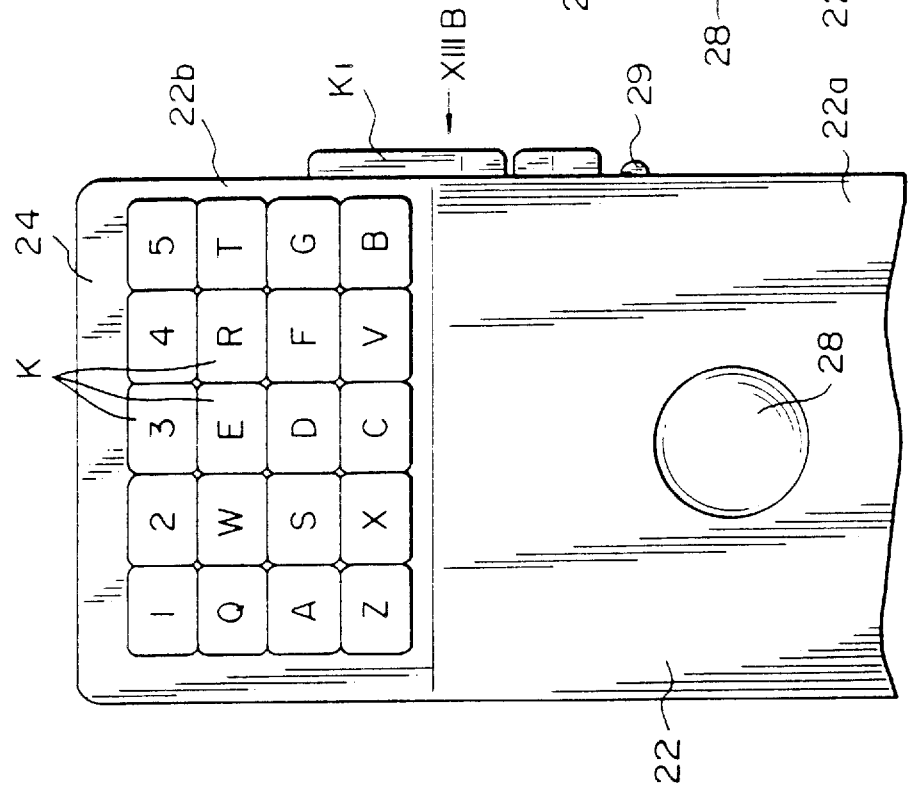

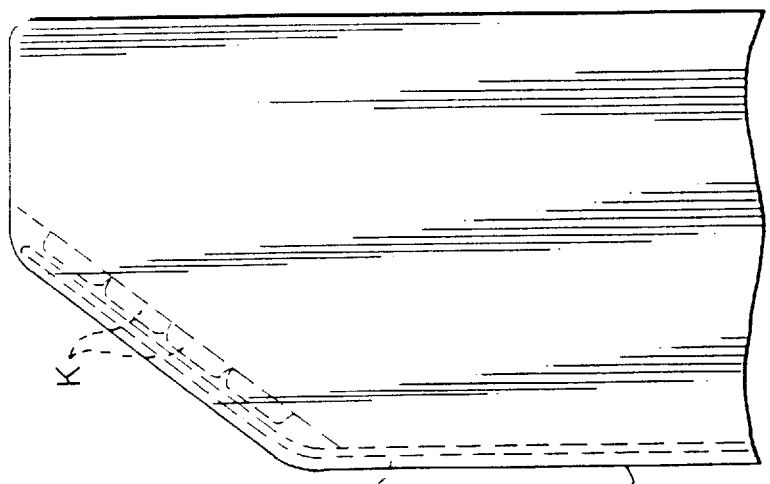
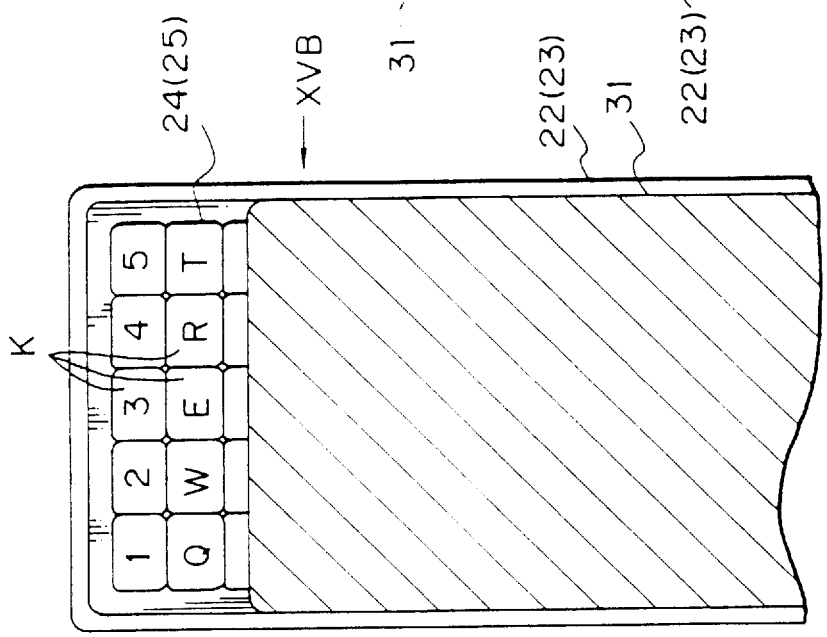

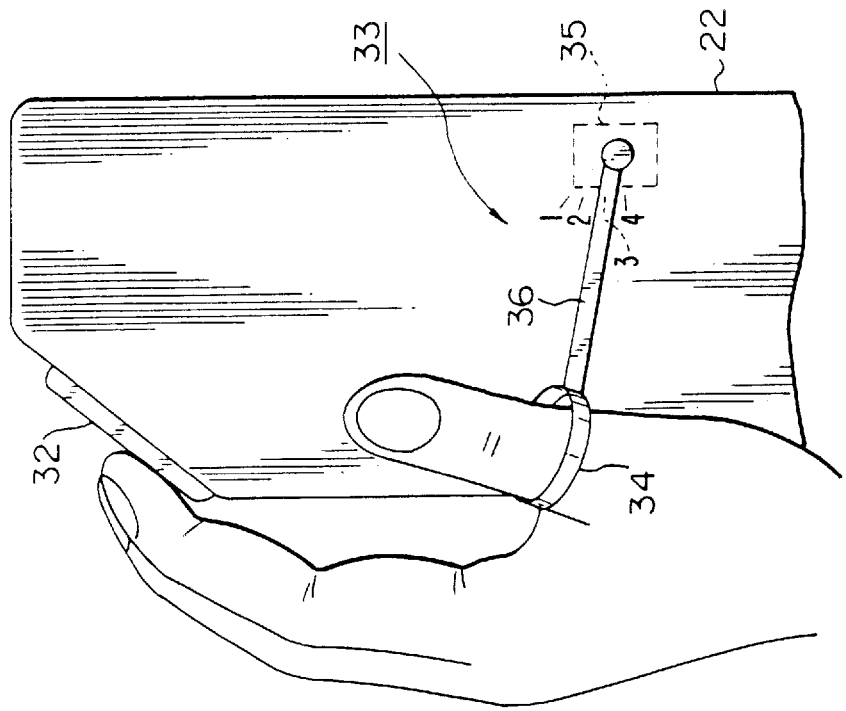
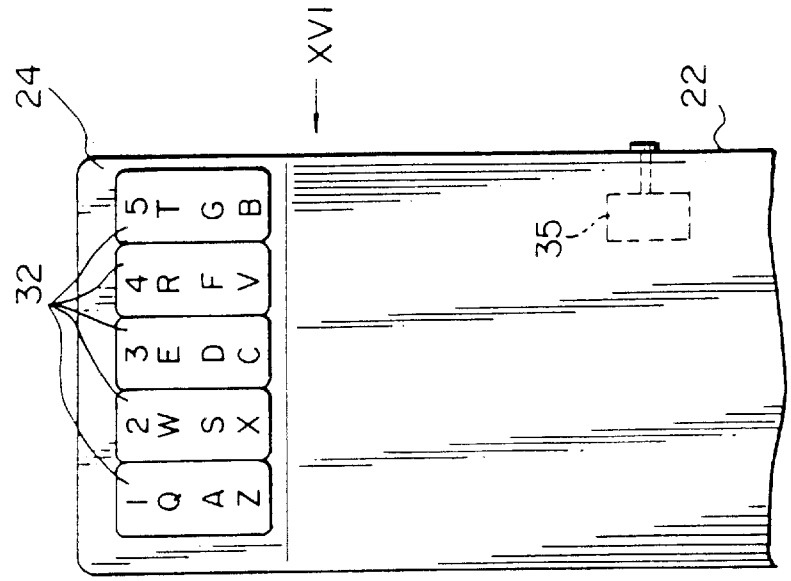

Fig. 18A
Fig. 18B
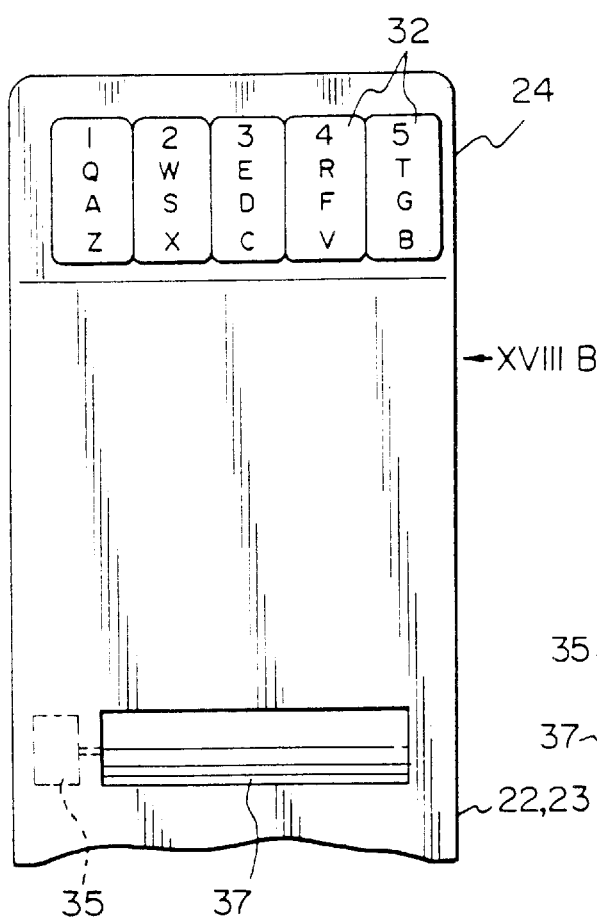
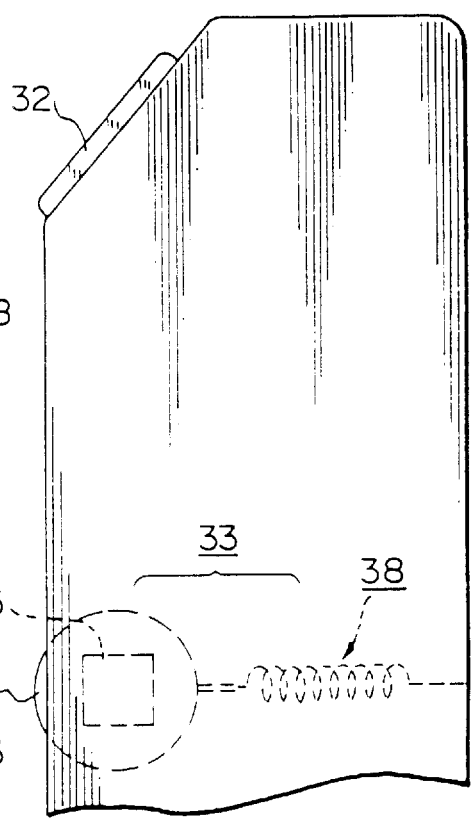

Fig. 19A
Fig. 19B
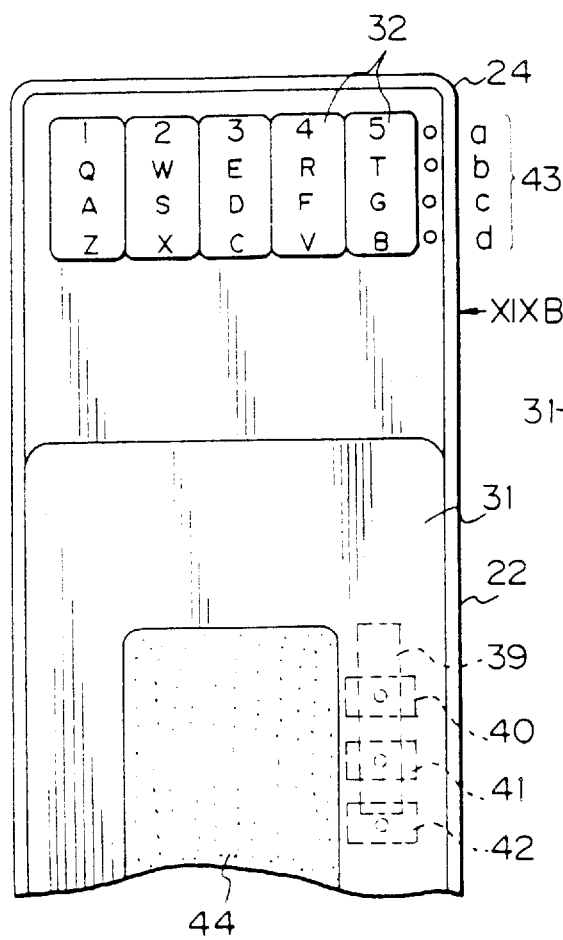
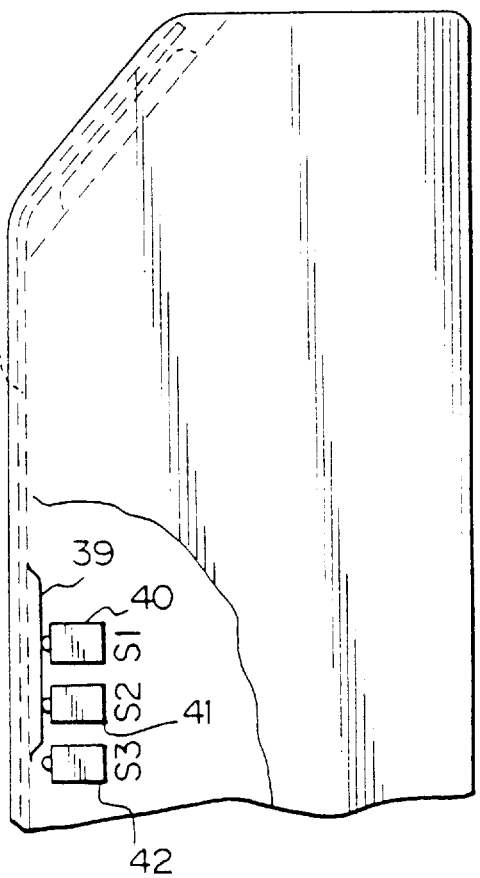

CHAIR WITH A SUPPLEMENTAL KEYBOARD AND A KEYBOARD SYSTEM

BACKGROUND OF THE INVENTION

1. Field of the Invention

The present invention generally relates to a keyboard for an information processing apparatus, and in particular, relates to a keyboard system comprising a main keyboard incorporated in an information processing apparatus and a supplemental keyboard provided in armrests of a chair.

2. Description of the Related Art

With the development of information processing apparatuses, the importance of keyboards is growing. Keyboards have keys bearing characters and incorporating electrical switching devices therein to transfer ideas to the information processing apparatuses. Information processing apparatuses are increasing in popularity, and the substantial time during which operators operate keyboards is increasing. In view of this, it is necessary that an operator not become fatigued even during extended use of a keyboard.

U.S. Pat. No. 4,378,553 discloses a keyboard comprising two separate keyboard halves on a stand. The total number of keys of the keyboard halves correspond to a set of keys of a standard typewriter. Keys on one of the keyboard halves can be operated by the left hand and the keys of the other keyboard half can be operated by the right hand. A pair of armrest structures are secured to the stand so that a person can operate the keys on the keyboard halves with his arms rested on the armrests.

U.S. Pat. No. 4,913,573 and U.S. Pat. No. 4,917,516 also discloses a split keyboard comprising two separate keyboard housing each constructed like a mouse with a plurality of finger wells on the upper surface thereof for inserting fingers of an operator. Keys are provided on the side and bottom walls of each of the finger wells. Total keys of the keyboard housing correspond to a set of keys of a standard typewriter and the keys in one of the keyboard housings can be operated by the left hand and the keys of the other keyboard housing can be operated by the right hand.

Usually, a keyboard and an associated information processing apparatus are placed on a desk, and an operator sitting in a chair operates the keyboard in a particular position with his arms extended. During an extended operation, the operator may experience fatigue in his arms or hands and become uncomfortable, or the operator may experience stiffness in his shoulders and back, thereby causing a person to feel unfavorable towards information processing apparatuses, or subjecting a person to mental stress as a result of using information processing apparatuses. In the above described United States Patents, the keyboard with an information processing apparatus is placed on a desk and therefore induces fatigue during extended use thereof.

The operator may take a short rest when he experiences fatigue or the operator may sometimes put his hands on the front edge of the keyboard or on the desk, or adopt a more relaxed position with his hands free of the keyboard. However, after these rest periods, the operator must return to the keyboard and there is no progress of work during said rest periods.

SUMMARY OF THE INVENTION

The object of the present invention is to solve the above described problem and provide a chair with a keyboard that can be operated in a relaxed position.

Another object of the present invention is to provide a keyboard system that can be operated in relaxed normal working position.

Another object of the present invention is to provide a keyboard system that allows an operator to experience less fatigue during extended use and thereby remain comfortable.

According to the present invention, there is provided a chair comprising a seat having opposite sides, first and second armrests arranged on either side of the seat and fixed to the seat, and a keyboard means arranged in the armrests; said keyboard means comprising a first group of keys arranged in the first armrest for operation by one of the hands of an operator, and a second group of keys arranged in the second armrest for operation by the other hand of the operator.

Thereby making it possible to operate the keyboard while the operator is sitting in the chair with his forearms naturally resting on the armrests of the chair, and thus mitigating the fatigue of the operator during extended use.

According to a further aspect of the present invention, there is provided a keyboard system comprising a main keyboard having a plurality of keys bearing respective characters and arranged in a predetermined pattern for inputting data to an information processing apparatus, and a supplemental keyboard means arranged in the armrests of a chair and including keys bearing identical characters to those of at least a part of the keys of the main keyboard for inputting data to the information processing apparatus parallel to the main keyboard.

Thereby making it possible to alternatively operate the main keyboard and the supplemental keyboard while the operator sits in the chair. The main keyboard may have a full set of keys in the conventional keyboard and the supplemental keyboard may preferably have keys identical to a part of the main keyboard that is most frequently used, i.e., alphanumeric keys. The keys of the supplemental keyboard are arranged in a pattern similar to those of the main keyboard and can be operated by the left and right hands comfortably with the forearms of the operator resting naturally on the armrests of the chair, thus mitigating the fatigue of the operator during extended used.

BRIEF DESCRIPTION OF THE DRAWINGS

The present invention will become more apparent from the following description of the preferred embodiments, with reference to the accompanying drawings, in which:

FIG. 10A is a partial plan view of the left armrest according to the second embodiment of the present invention;

FIG. 10B is a side view of the left armrest of FIG. 10A, viewed from the arrow X B in FIG. 10A;

FIG. 10C is a side view of the left armrest of FIG. 10A, viewed from the arrow X C in FIG. 10A;

FIG. 11A is a partial plan view of the right armrest according to the second embodiment of the present invention;

FIG. 11B is a side view of the right armrest of FIG. 11A, viewed from the arrow X I B in FIG. 11A;

FIG. 11C is a side view of the right armrest of FIG. 11A, viewed from the arrow X I C in FIG. 11A;

FIG. 13A is a partial plan view of the left armrest according to the third embodiment of the present invention;

FIG. 13B is a side view of the left armrest of FIG. 13A, viewed from the arrow X III B in FIG. 13A;

FIG. 15A is a partial plan view of the left armrest according to the fifth embodiment of the present invention;

FIG. 15B is a side view of the left armrest of FIG. 15A, viewed from the arrow X V B in FIG. 15A;

FIG. 16A is a partial plan view of the left armrest according to the sixth embodiment of the present invention;

FIG. 16B is a side view of the left armrest of FIG. 16A, viewed from the arrow X VI B in FIG. 16A;

FIG. 18A is a partial plan view of the left armrest according to the seventh embodiment of the present invention;

FIG. 18B is a side view of the left armrest of FIG. 18A, viewed from the arrow X VIII B in FIG. 18A;

FIG. 19A is a partial plan view of the left armrest according to the eighth embodiment of the present invention;

FIG. 19B is a partially enlarged side view of the left armrest of FIG. 19A, viewed from the arrow X IX B in FIG. 19A;

DESCRIPTION OF THE PREFERRED EMBODIMENTS

Figure 1:
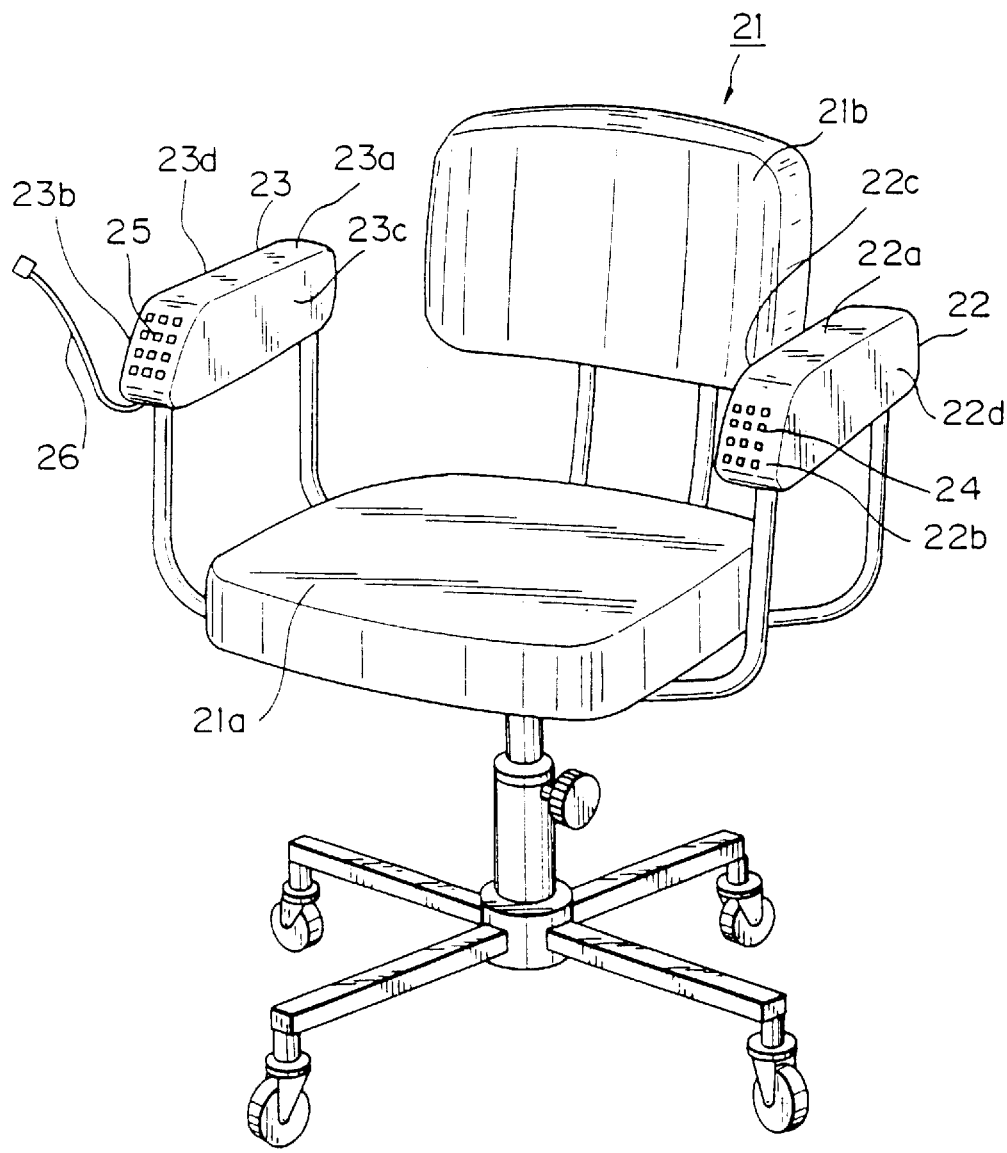
FIG. 1 is a perspective view of a chair with a supplemental keyboard according to the first embodiment of the present invention.

In FIG. 1, a chair 21 according to the present invention comprises a seat 21a with a backrest 21b, a left armrest 22, and a right armrest 23. The left armrest 22 and the right armrest 23 are arranged on either side of the seat 21a and fixed to the seat 21a, as in conventional chairs. The left armrest 22 and the right armrest 23 have top surfaces 22a and 23a, front surfaces 22b and 23b, inner side surfaces 22c and 23c, and outer side surfaces 22d and 23d, respectively. The front surfaces 22b and 23b are inclined to the top surfaces 22a and 23a.

The chair 21 includes a keyboard comprising a left keyboard half 24 arranged on the front surface 22b of the left armrest 22 and a right keyboard half 25 arranged on the front surface 23b of the right armrest 23. These left and right keyboard halves 24 and 25 are electrically connected to each other and a cable 26 extends from the right keyboard half 25.

Figure 2:
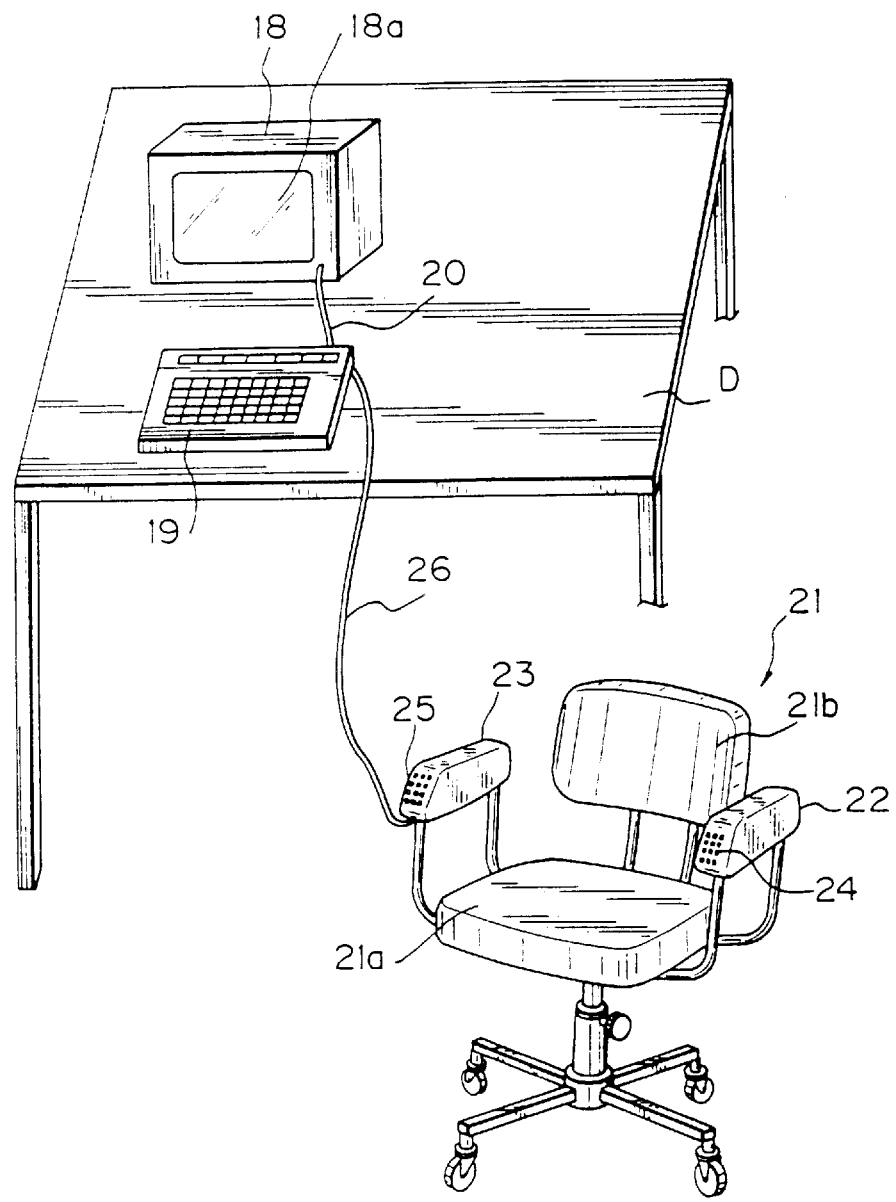
FIG. 2 is a perspective view of a keyboard system according to the present invention, comprising a main keyboard incorporated with an information processing apparatus and the supplemental keyboard provided in the chair of FIG. 1.

In FIG. 2, there is an information processing apparatus 18 such as a microcomputer or a wordprocessor including a display 18a at the front surface thereof. A main keyboard 19 is connected to the information processing apparatus 18 via a cable 20. The information processing apparatus 18 and the main keyboard 19 are placed on a desk D, and the chair 21 is placed in front of the desk D. The cable 26 is connected to the main keyboard 19 and the left and right keyboard halves 24 and 25 act as a supplemental keyboard. It is therefore possible for a person sitting on the chair 21 to alternatively operate the main keyboard 18 or the supplemental keyboard.

Figure 3A:
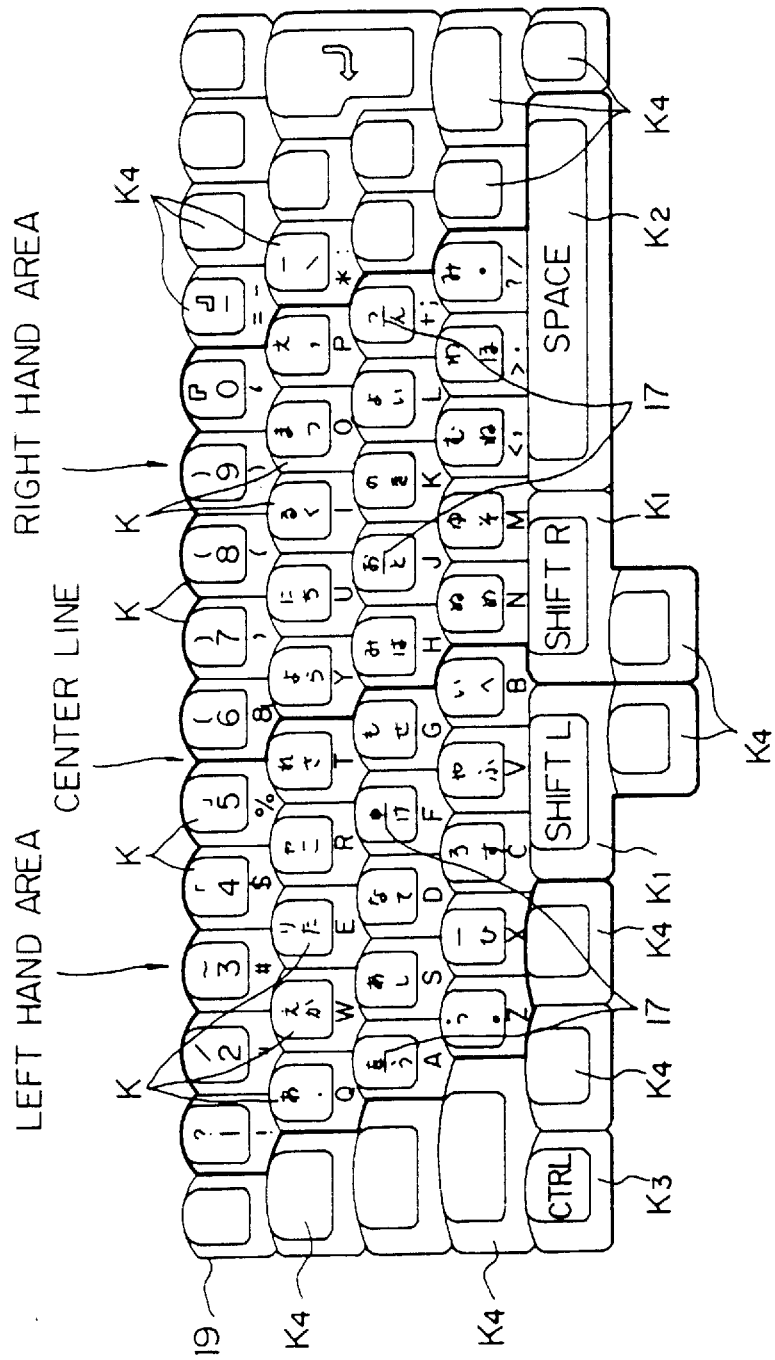
FIG. 3A is a diagrammatic view of a main keyboard in Japanese style.

FIG. 3A shows an example of the main keyboard 19 having keys arranged in Japanese style. The main keyboard 19 has a plurality of keys K bearing respective characters and arranged in a predetermined pattern for inputting data to the information processing apparatus 18. In the Japanese style main keyboard 19, Japanese characters and numerals are marked on the top of the keys K. In addition, each key K bears an English letter or a numeral at the front side surface thereof. It can be seen that the keys K at the top column bear the numerals 1, 2, 3, . . . to 0, the keys K at the second column bear the English letters Q, W, E, . . . to P, and so on.

Figure 3B:
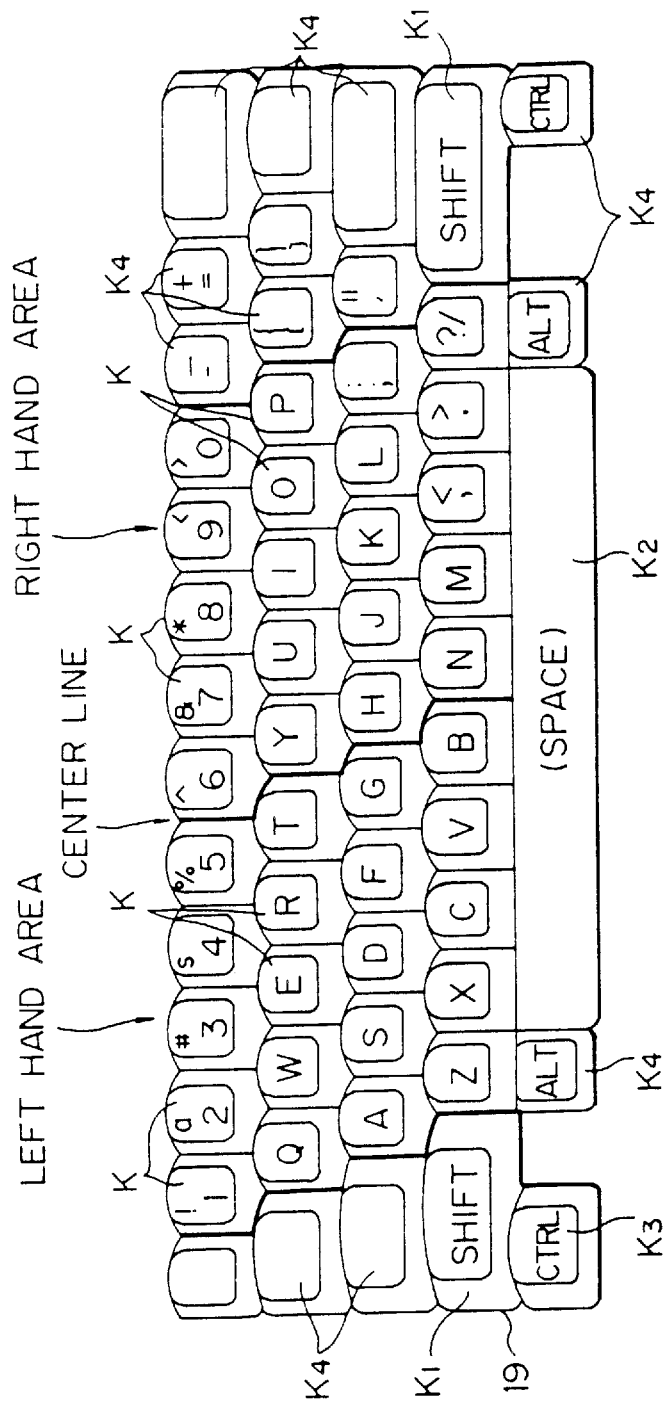
FIG. 3B is a diagrammatic view of another example of a main keyboard in English style.

FIG. 3B shows an example of the main keyboard 19 in English style. It can be seen that the keys K at the top column bear the numerals 1, 2, 3, . . . to 0, the keys K at the second column bear the English letters Q, W, E, . . . to P, and so on. Accordingly, the arrangement of the keys K of the Japanese style main keyboard 19 is generally identical to the arrangement of the keys K of the English style main keyboard 19.

These character keys K are arranged in a matrix with ten rows and four columns, and are usually divided by a center line into a left hand area including a first group of keys K for operation by the left hand of the operator, and a right hand area including a second group of keys K for operation by the right hand of the operator. In FIG. 3A, there are small projections 17 on "A" key, "F" key, "L" key and "+" key, showing a home position of the hands; the little finger and the index finger of the left hand are placed on "A" key and "F" key, and the little finger and the index finger of the right hand are placed on "+" key and "J" key, so that the operator can recognize the home position of the main keyboard and the other keys K without substantially viewing the characters of the keys individually.

The main keyboard 19 also includes shift keys $K_1$, a space key (a space bar) $K_2$, a control (CTRL) key $K_3$, and other control and function keys $K_4$ arranged around the character keys K and assigned to the left and right hands, respectively. The character keys K bearing alphanumeric characters are most often used.

Figure 4:
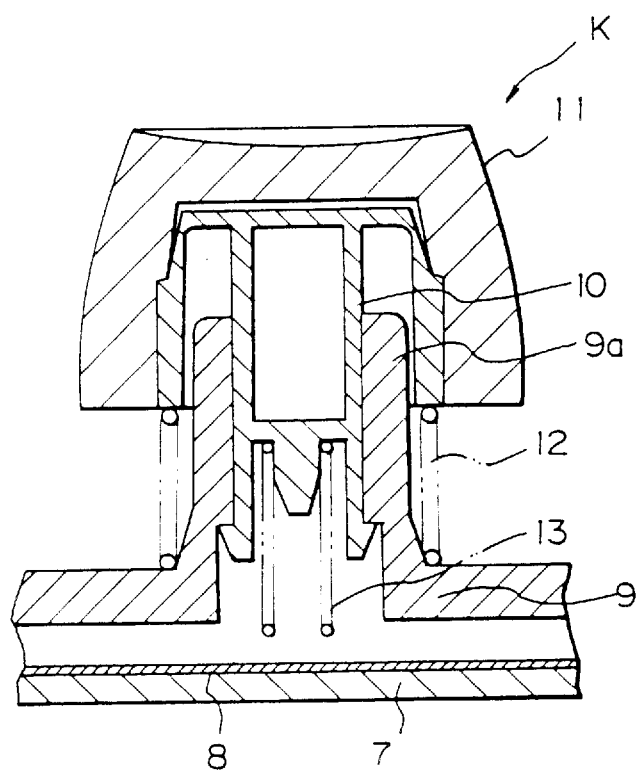
FIG. 4 is a cross-sectional view of one of the keys.

FIG. 4 shows an example of the construction of one of the keys K of the main keyboard 19 (and the supplemental keyboard). The key K includes a key top 11 having a slider 10. The main keyboard 19 includes a support panel 7 made of steel or the like and a housing 9 having an upright cylindrical support post 9a to which the slider 10 of the key top 11 is slidably received. Springs 12 and 13 are provided to return the key top 11 to an initial position. A membrane sheet 8 is supported on the support panel 7 and the bottom of the slider 10 can push the membrane sheet 8 when the key K is operated.

Figure 5:
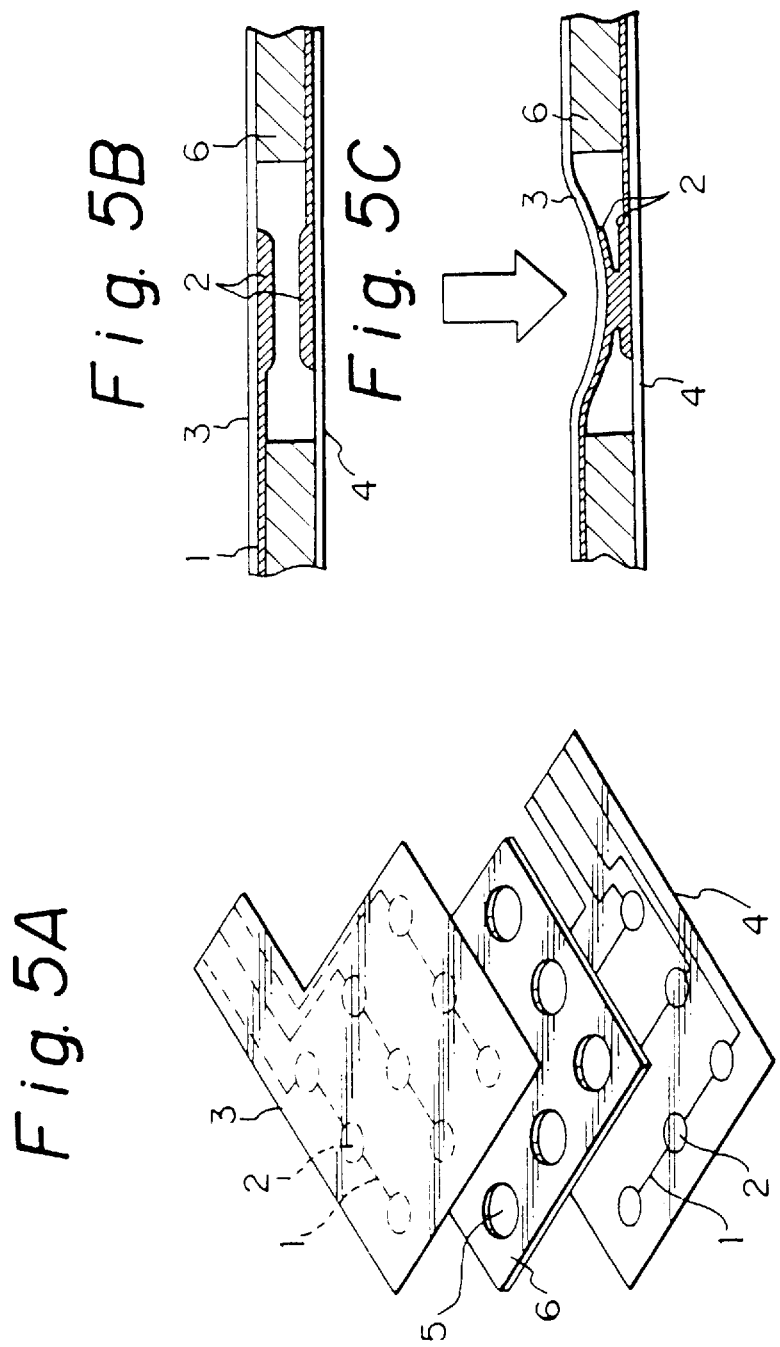
FIG. 5A is a perspective view of the membrane sheet used as a switch in the key of FIG. 4.
FIG. 5B is a schematic cross-sectional view of the membrane sheet of FIG. 5A.
FIG. 5C is a schematic cross-sectional view of the membrane sheet of FIG. 5B when pushed.

FIGS. 5A to 5C show the membrane sheet 8 in detail. The membrane sheet 8 comprises a top sheet 3 made of, for example, polyester, having an electrical conductor pattern 1 and switch contacts 2 formed of an ink of, for example, silver or carbon, a spacer sheet 6 having apertures 5, and a bottom sheet 4 having an electrical conductor pattern 1 and switch contacts 2. As will be apparent, the keys are arranged at the position of the apertures 5 and the switch contact 2 of the top sheet 3 is brought into contact with the switch contact 2 of the bottom sheet 4 when the key is depressed. While the membrane sheet 8 is used as switches of the keys, it is possible to use other switches such as reed switches, mechanical switches, or conductive rubber switches.

Figure 6:
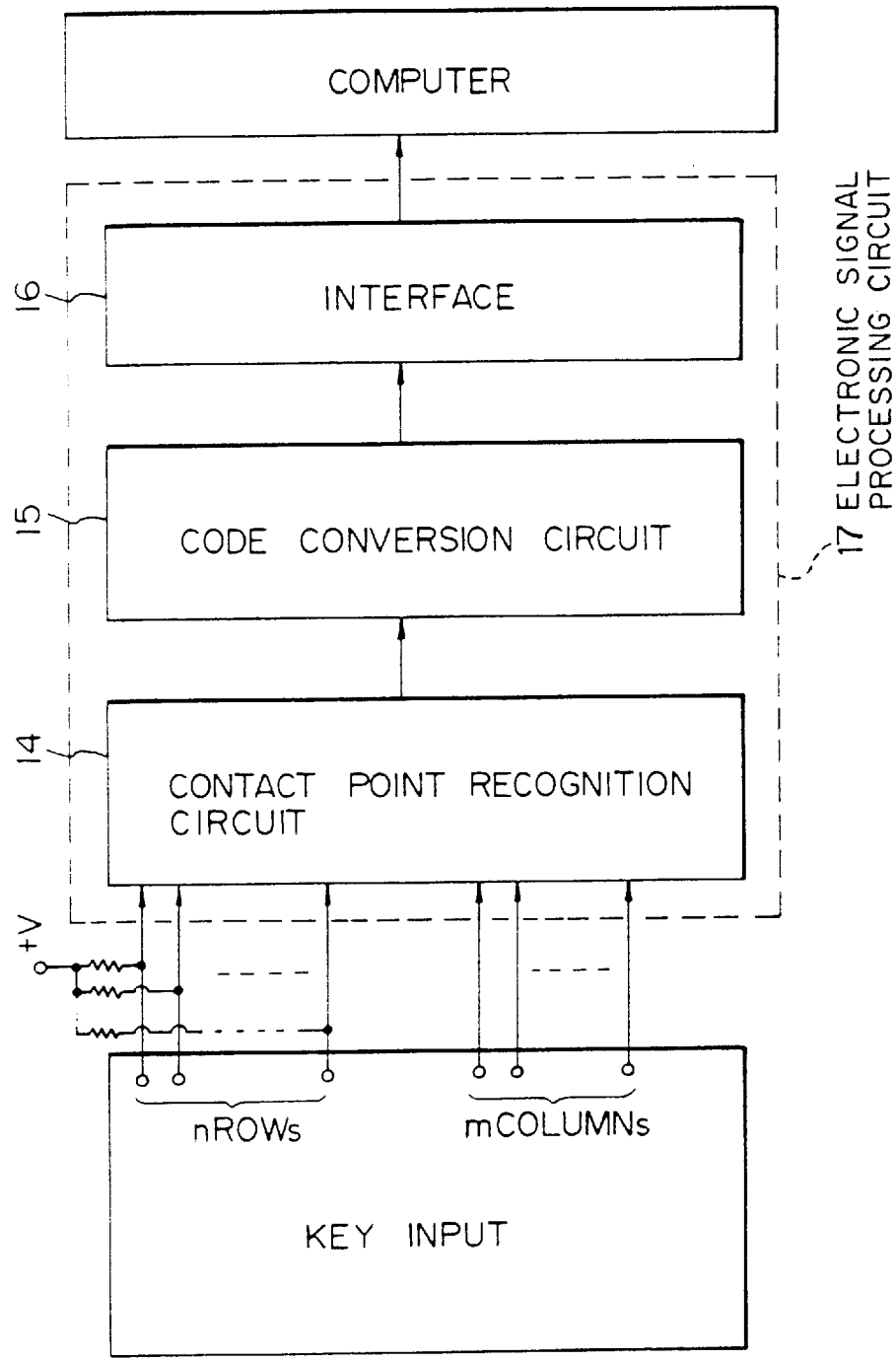
FIG. 6 is a diagram of the electronic circuit in the main keyboard.

FIG. 6 is a diagram of an electronic signal processing circuit provided in the main keyboard 19. The electronic signal processing circuit includes a contact point recognition circuit 14 for identifying a key K that is operated, a code conversion circuit 15 for converting the data of the recognized key such as a letter or a numeral to digital data, and an interface 16 by which the signals are delivered to a main computer of the information processing apparatus 18. In actual products, these three circuits 14, 15, and 16 are composed of one chip MPU such as 8048.

The switch contacts 2 in FIG. 5A are arranged in a matrix of "m" columns and "n" rows, the conductor pattern 1 of the top sheet 3 comprises m columns of conductor lines and the conductor pattern 1 of the bottom sheet 4 comprises n rows of conductor lines. The (n+m) conductor lines are connected to the contact point recognition circuit 14. Recognition of the depressed key can be carried out conventionally, for example, the terminals of the n rows of conductor lines are held at "1" level via resistors, and the voltage of the respective terminals are monitored. The m columns of conductor lines are scanned by successively connecting the terminals of the m columns of conductor lines to "0" level. If the voltage of the terminal of the n1 row is reduced to "0" level when the voltage of the terminal of the m2 (or mb) position is connected at "0" level, it can be determined that the operated key is a "Q" key, for example. When a key is not operated, the voltage of the terminals in all rows are maintained at "1" level.

In the supplemental keyboard, the keys are arranged in the following manner.

Figure 7:
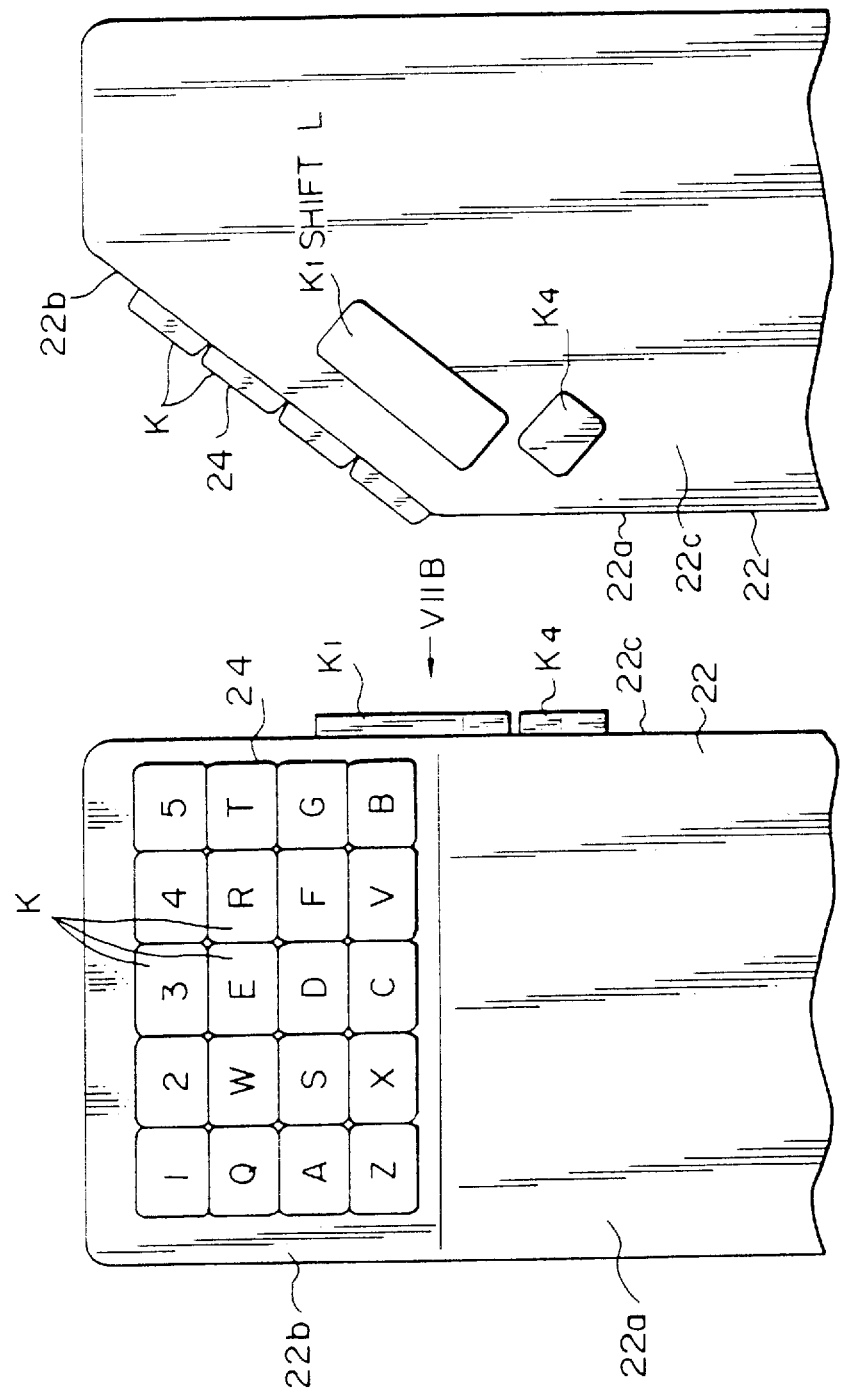
FIG. 7A is a partial plan view of the left armrest of FIG. 1.
FIG. 7B is a side view of the left armrest of FIG. 7A, viewed from the arrow VII B in FIG. 7A.

FIGS. 7A and 7B show the keys in the left armrest 22 of FIGS. 1 and 2. The keys K on the front surface 22b of the left armrest 22 correspond to the keys K in the left hand area of the main keyboard 19. One of the shift keys $K_1$ and the other function key $K_4$ are arranged on the inner surface 22c of the left armrest 22.

Figure 8:
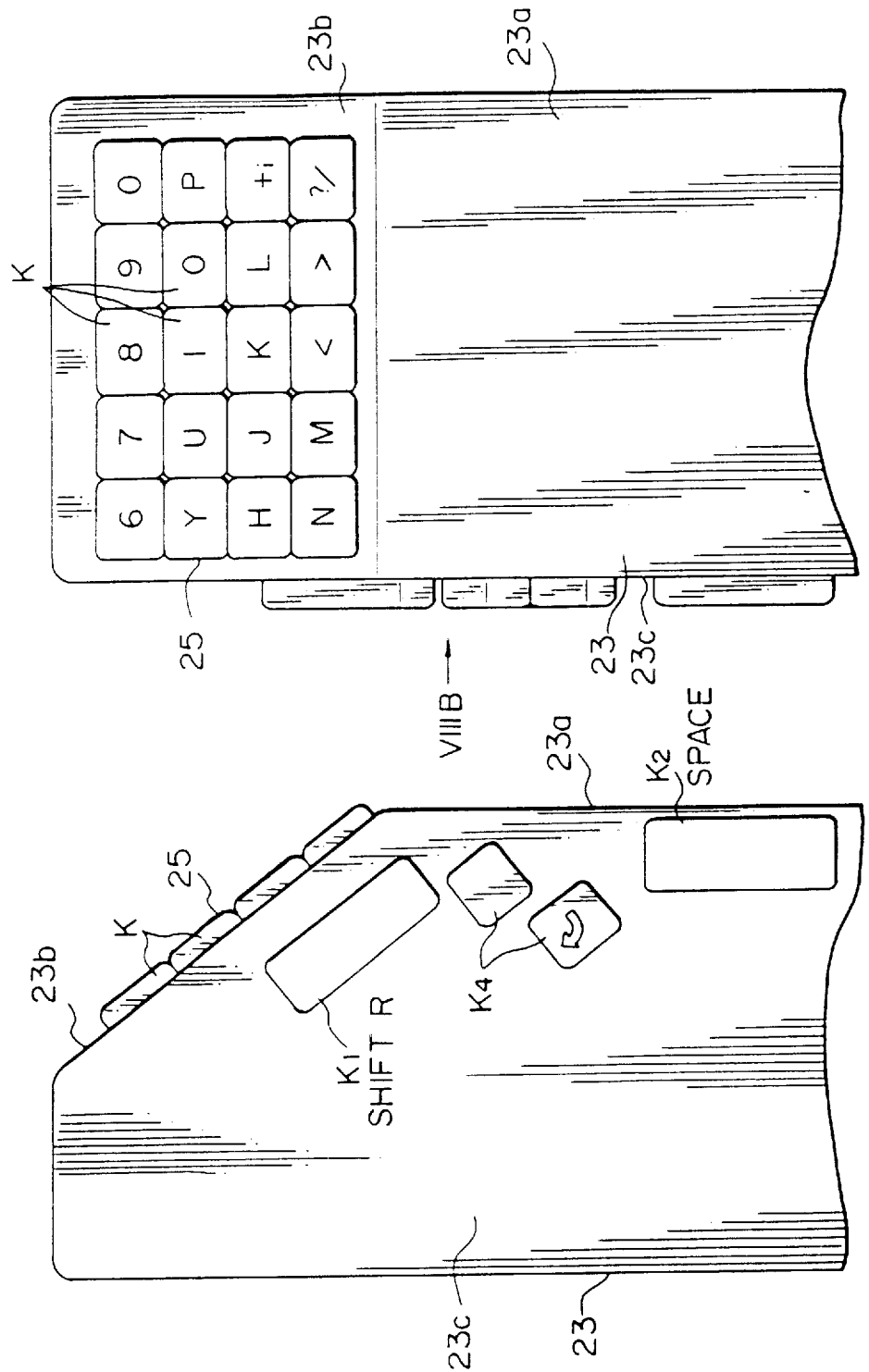
FIG. 8A is a partial plan view of the right armrest of FIG. 1.
FIG. 8B is a side view of the right armrest of FIG. 8A, viewed from the arrow VII B in FIG. 8A.

Similarly, FIGS. 8A and 8B show the keys in the right armrest 23 of FIGS. 1 and 2. The keys K on the front surface 23b of the right armrest 23 correspond to the keys K in the right hand area of the main Keyboard 19. One of the shift keys $K_1$, the space key $K_2$, and the other function key $K_4$ are arranged on the inner surface 23c of the right armrest 23.

The keys K on the front surfaces 22b and 23b of the left and right armrests 22 and 23 can be operated by four fingers of the left and right hands, respectively. The shift key $K_1$, the space key $K_2$, and the other function key $K_4$ on the inner surfaces 22c and 23c of the left and right armrests 22 and 23 can be operated by the thumbs of the left and right hands, respectively.

During operation, it is possible to operate the supplemental keyboard while the operator sits on the seat 21a of the chair 21 with his forearms resting naturally on the armrests 22 and 23 of the chair 21, and thus in a relaxed position thereby mitigating the fatigue of the operator during extended use.

In addition, it is possible to alternatively operate the main keyboard 19 and the supplemental keyboard while the operator sits in the chair 21. The operator may operate the main keyboard 19 and when the operator becomes tired he can operate the supplemental keyboard in the armrests 22 and 23 of the chair 21 in more relaxed position, in particular, a position in which the back of the operator may fully rest on the backrest 21b of the chair 21.

Also, in the preferred embodiment, the supplemental keyboard is split into the left and right keyboard halves 24 and 25, but when the keys in the left and right keyboard halves 24 and 25 are viewed as a unit, the keys in the left keyboard half 24 and the keys in the right keyboard half 25 are arranged in a matrix pattern in correspondence with the matrix pattern of the main keyboard 19. Accordingly, it is possible to operate the supplemental keyboard with a relationship between the fingers and the keys identical to that when operating the main keyboard 19, and thus it is possible to operate the supplemental keyboard by touch identifying the keys without substantially viewing the keys individually.

Figure 9:
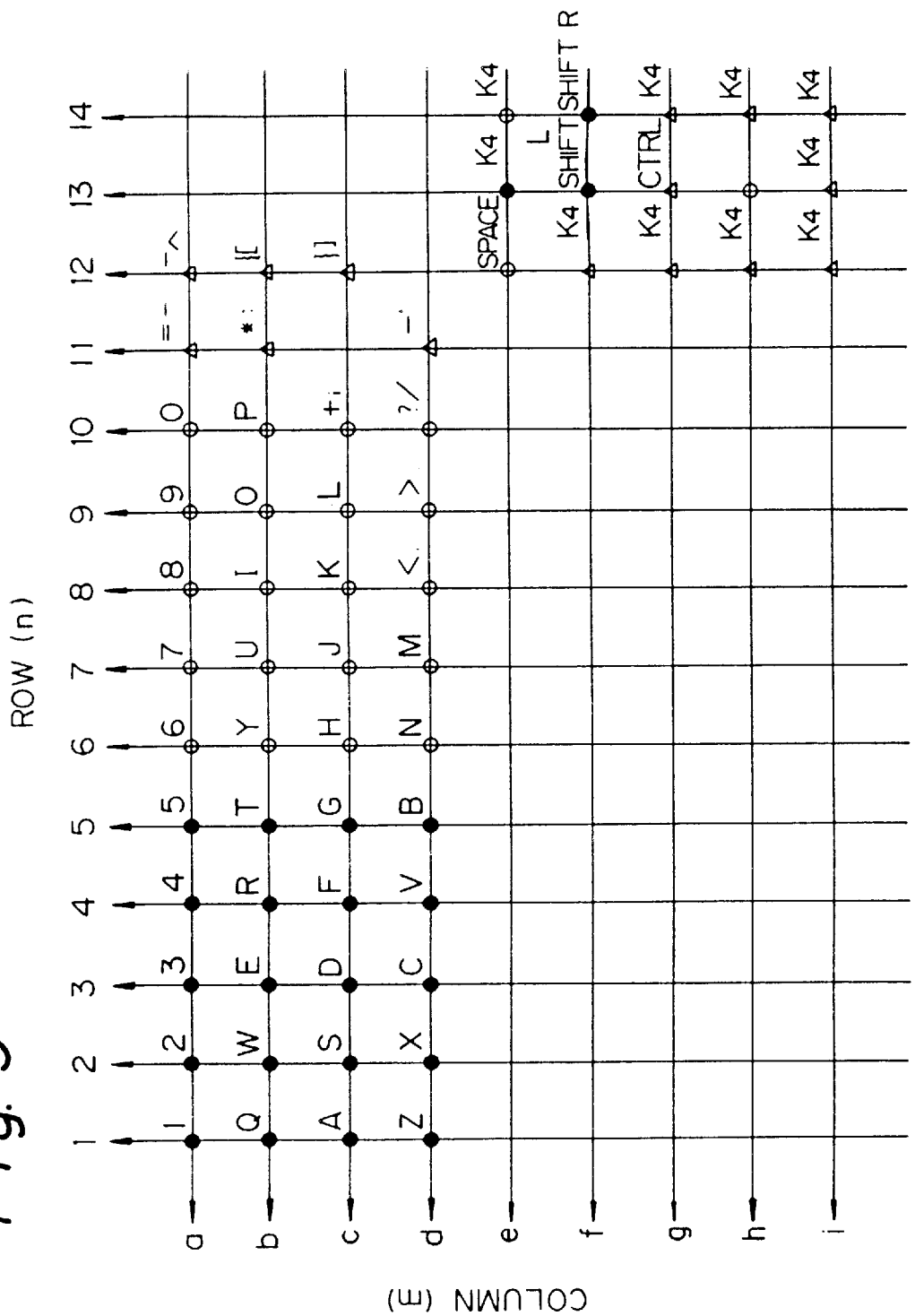
FIG. 9 is a wiring diagram of the matrix arrangement of the keys.

FIG. 9 shows a wiring diagram of the matrix arrangement of the keys of the main keyboard 19 and the supplemental keyboard. The solid circular marks designate the keys that are provided in both the main keyboard 19 and the left armrest 22 of the supplemental keyboard; the hollow circular marks designate the keys that are provided in both the main keyboard 19 and the right armrest 23 of the supplemental keyboard, and the triangular marks designate the keys that are provided only in the main keyboard 19. Although the triangular marked keys are less frequently used and are not provided in the armrests 22 and 23 of the chair 21, it is possible to provide at least a part of the triangular marked keys in the armrests 22 and 23 as desired.

FIG. 9 shows that the keys of the supplemental keyboard are arranged in a matrix of rows of conductors and columns of conductors similar to those of the main keyboard 19, and the rows of conductors and columns of conductors of the supplemental keyboard are connected to the rows of conductors and columns of conductors of the main keyboard 19, respectively. The rows of conductors and columns of conductors (1 in FIG. 5A) of the main keyboard 19 are connected to the contact point recognition circuit 14 of the electronic signal processing circuit 17, as described with reference to FIG. 6. The corresponding rows of conductors and columns of conductors of the supplemental keyboard can also be connected to the contact point recognition circuit 14 of the electronic signal processing circuit 17 parallel to the rows of conductors and columns of conductors of the main keyboard 19.

FIGS. 10A to 10C, 11A to 11C and 12 show the second embodiment of the present invention. In this embodiment, a majority of the keys K are arranged on the front surface 22b or 23b of each armrest 22 or 23 and a minority of the keys K are arranged on the outer side surface 22d or 23d of each armrest 22 or 23 for operation by the little finger of an operator. Also, at least one control and function key $K_4$ is arranged on the outer side surface 22d or 23d of each armrest 22 or 23 on the side of the keys K remote from the keys K on the front surface 22b or 23b.

It is known that the pitch between adjacent keys on the keyboard is preferably 18 to 20 millimeters for easy operation and the pitch values between adjacent keys are standard in many countries. In general, the chosen value for the pitch is approximately 19 millimeters. In the first embodiment, five rows of keys are arranged on the front surface 22b or 23b and the width of the armrest 22 or 23 may be approximately 10 centimeters. In the second embodiment, four rows of keys are arranged on the front surface 22b or 23b and the width of the armrest 22 or 23 may be approximately 8 centimeters.

During normal operation for inputting alphanumeric characters, it is sufficient that the keys are arranged in five rows on the front surface 22b or 23b of each armrest 22 or 23 in the supplemental keyboard. However, depending on the kind of documents to be input by the keyboard, some control and function keys $K_4$, around the alphanumeric keys K, such as further shift keys and mathematical symbol keys (+, −, =) may be frequently used. If these keys are arranged on the front surface 22b or 23b of each armrest 22 or 23, six rows of the keys must be arranged and the width of the armrest 22 or 23 becomes approximately 12 centimeters. Such a wide armrest may detract from the appearance of the chair 21. In addition, further control and function keys such as a return key, an erase key, and command keys for the information processing apparatus and the printer may be arranged in additional rows.

In 10A to 10C, and 11A to 11C, the alphanumeric keys K are arranged in four rows on the front surface 22b or 23b of each armrest 22 or 23 and the remaining alphanumeric keys K are arranged in one row on the outer side surface 22d or 23d for operation by the little finger of an operator. The equivalent of this one row of keys in the main keyboard 19 is also operated by the little finger of an operator and the operator may operate the one row keys on the outer side surface 22d or 23d of the supplemental keyboard in the same manner as he operates the main keyboard 19.

The equivalent of some control and function keys $K_4$ usually arranged around the alphanumeric keys K in the main keyboard 19 and operated by the little finger are also arranged on the outer side surface 22d or 23d. One of the control and function keys $K_4$ has an elongated shape (FIGS. 10B and 11C) and is arranged on the outer side surface 22d or 23d of each armrest 22 or 23 on the side of the one row of keys K remote from the keys K on the front surface 22b or 23b. This elongated key $K_4$ preferably has a height greater than that of the one row of keys K by several millimeters so that the key top of the elongated key $K_4$ acts as a guide along which the little finger slides for operating the one row of keys K so as to provide an accurate key operation.

Figure 12:
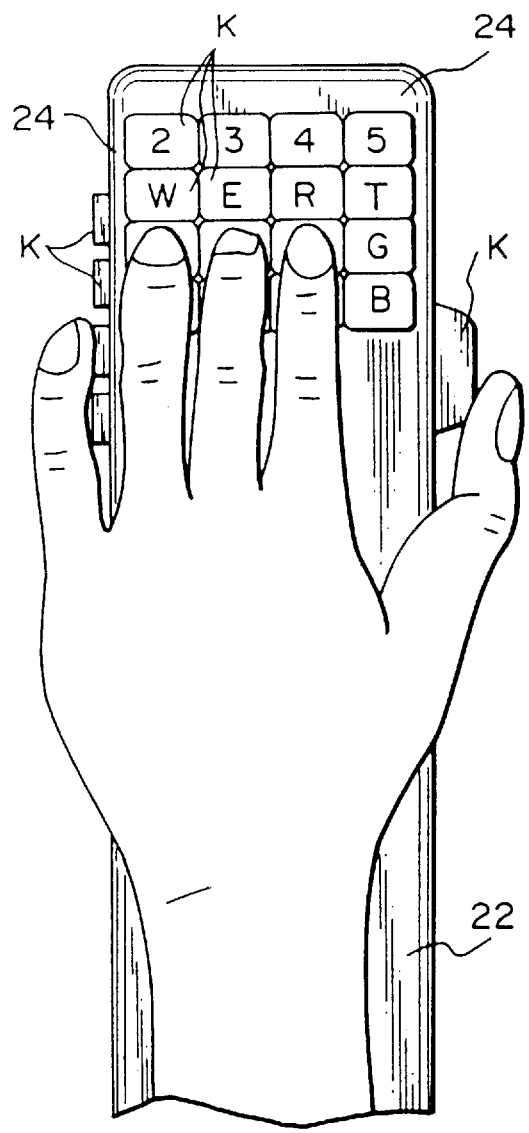
FIG. 12 is a top view of the left armrest of FIG. 10A when operated by the left hand of the operator.

FIG. 12 shows the operation of the supplemental keyboard in the second embodiment. FIG. 12 shows only the left keyboard half 24 but it will be appreciated that the right keyboard half 25 may be similarly operated. FIG. 12 shows the fingers of the left hand of the operator at home position, in which the little finger is placed on the "A" key on the outer side surface 22d, the ring finger on the "S" key, the middle finger on the "D" key, and the index finger on the "F" key. Also, the thumb is placed on the shift key $K_1$ on the inner side surface 22c of the armrest 22. As shown in FIGS. 10A and 10B, small projections 27 are provided on "A", "S", and "F" keys for touch identification.

As shown in FIG. 12, the operator softly holds the supplemental keyboard by the palm of his hand. The operation of the keys of the top column, the second column, and the fourth column is carried out by sliding the hand along the top surface 22a of the armrest 22 and moving the tips of the fingers in an arcuate path. In this case, the radius of curvature of the tip of the little finger is small and the travelling distance of the little finger is relatively small compared to the other fingers. Therefore, it is preferable to select a column pitch between adjacent keys assigned to the little finger to a value smaller than that of the other fingers by 2 to 3 millimeters. In this embodiment, the column pitch for the keys on the front surface 22b is 19 millimeters, and the column pitch for the keys on the outer side surface 22d is 16 millimeters.

As shown in FIGS. 10A and 10B, there is a control (CTRL) key $K_3$ that is simultaneously operated with another key arranged at or adjacent to a corner between the top surface 22a and the outer side surface 22d of the left armrest 22. As will be apparent from FIG. 12, this control (CTRL) key $K_3$ can be operated by the palm of the hand near the little finger. It is also possible to arrange the control (CTRL) key $K_3$ at or adjacent to a corner between the top surface 22a and the inner side surface 22c of the left armrest 22, and in this case, it can be operated by the palm of the hand near the thumb. As shown in FIGS. 11A and 11B, the space key or bar $K_2$ is arranged at or adjacent to a corner between the top surface 23a and the inner side surface 23c of the right armrest 23 for operation by the palm of the hand near the thumb.

FIGS. 13A and 13B show the third embodiment of the present invention. In this embodiment, a pointing device comprising a trackball 28 is arranged on the top surface 22a of the left armrest 22 of the chair 21 so that the trackball 28 is operated by the palm of the hand. A click button 29 is provided on the inner side surface 22c of the left armrest 22 for transferring a decision of the operator to the information processing apparatus 18 during operation of the pointing device. It is also possible to arrange a pointing device and the click button on the top surface 23a of the right armrest 23 of the chair 21.

With the recent tendency toward man-machine interfaces, graphical user interfaces (GUI) such as WINDOWS are being developed. During the operation of GUI, the pointing device, such as the trackball 28 or a mouse, is used to select one of the functions illustrated in the figures presented on the display (icon) so as to transfer ideas to the information processing apparatus 18. In this case, an inputting operation from the keyboard can also be used.

FIGS. 13A and 13B show the trackball 28 as an example of the pointing device. The trackball 28 is constructed to be freely rotatable in two directions perpendicular to each other and in a further oblique direction and a pointing mark such as a pointing arrow moves on the display with the rotation of the trackball 28. The trackball 28 is rotated so that the pointing mark is brought into a position in coincidence with the icon to be selected, and the click button 29 is operated to carry out the function of the selected icon. When the hand moves forward and backwards to operate the supplemental keyboard, the trackball 28 may be moved. However, in a usual keyboard input mode, the movement of the trackball 28 is ignored and there is no problem.

Figure 14B:
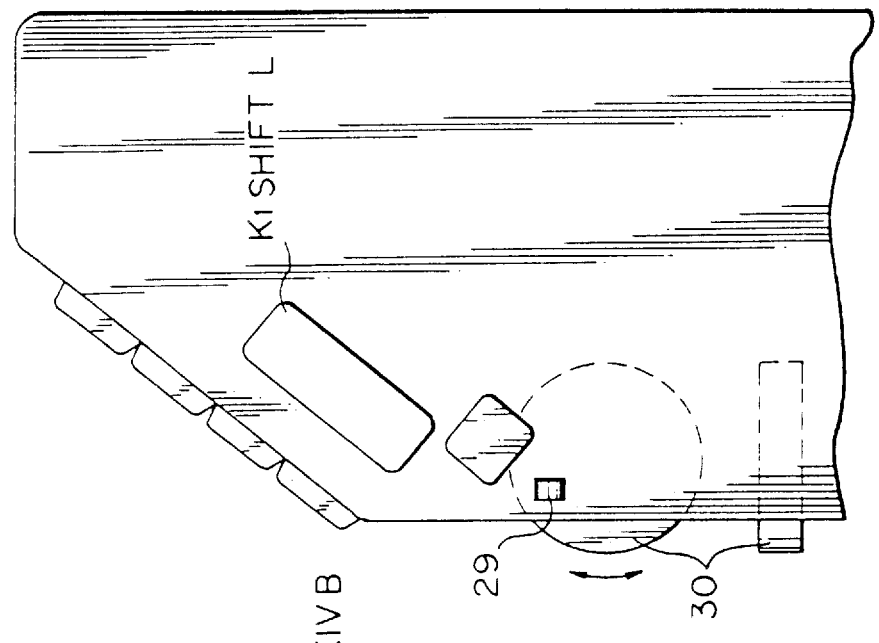
FIG. 14B is a side view of the left armrest of FIG. 14A, viewed from the arrow X IV B in FIG. 14A.
Figure 14A:
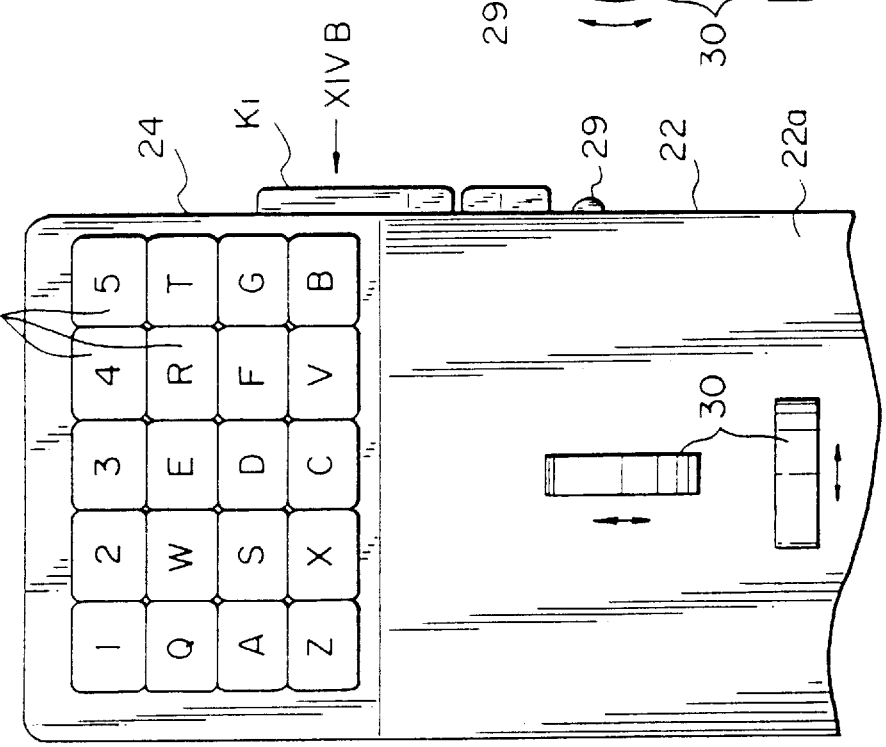
FIG. 14A is a partial plan view of the left armrest according to the fourth embodiment of the present invention.

FIGS. 14A and 14B show the fourth embodiment of the present invention. In this embodiment, the pointing device comprises a pair of rollers 30 arranged perpendicular to each other. These rollers 30 can be operated in a manner similar to the trackball. The pointing device comprising the trackball 28 or the rollers 30 can be operated so that it is rolled by the palm of the hand and it is possible to operate the pointing device comfortably and accurately.

FIGS. 15A and 15B show the fifth embodiment of the present invention. In this embodiment, a slide type cover 31 is provided on the armrest 22 (23) to cover the keys K. The cover 31 is made from a flexible plastic material and slidably fitted in grooves on both side edges of the armrest 22 (23) so that the cover 31 can move above the keys K. Accordingly, the cover 31 is pulled down to cover the keys K and protect the keys K from dust particles falling between the keys K when the supplemental keyboard is not used. The chair 21 thus has an appearance identical to a normal chair. The cover 31 is pulled up to an appropriate position to uncover the keys K and reveal the keys K when the supplemental keyboard is used. The chair 21 thus has an appearance identical to a normal chair.

Figure 17:
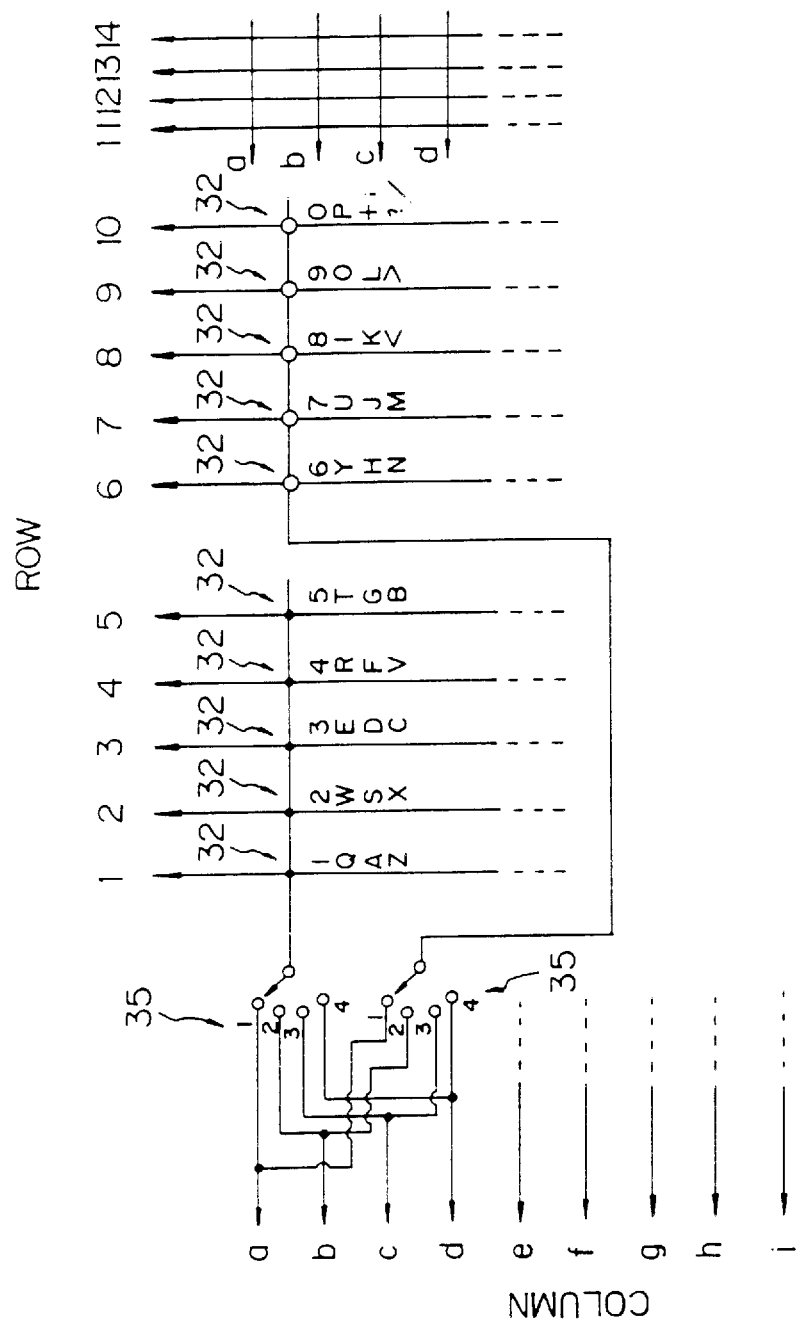
FIG. 17 is a wiring diagram of the matrix arrangement of the keys in the embodiment of FIGS. 16A and 16B.

FIGS. 16A, 16B, and 17 show the sixth embodiment of the present invention. In this embodiment, collective keys 32 are arranged in five rows and one column on the front surface 22b in the armrest 22, in place of the keys in five rows and four columns in the fifth embodiment. A column selecting means 33 is associated with the collective keys 32, which is also applied to the right armrest 23.

Each of the collective keys 32 bears a plurality of characters in correspondence with those of a plurality of keys in one column of the main keyboard 19. For example, the collective keys 32 on the left end bears "1", "Q", "A", and "Z" which correspond to the characters of the keys K in the left end row in the left hand area of the main keyboard 19 in FIGS. 3A and 3B. Thus, each of the collective keys 32 functions to input four characters, and the column selecting means 33 operated simultaneously with one of the collective keys 32 selects one of the four characters on that collective key 32.

The column selecting means 33 comprises a ring 34 securable around a thumb of an operator, a selecting switch 35 such as a rotary selecting switch, and a connecting member 36 interconnecting the ring 34 and the selecting switch 35. The selecting switch 35 has four contact points that correspond to the four characters on each of the collective keys 32.

When it is desired to input the character, "A", the column selecting means 33 is placed on the number three contact position, which is a home position, and the left end collective keys 32 are operated by the little finger of the left hand. When it is desired to input the numeral, "5", the column selecting means 33 is placed in the number one contact position, and the right end collective keys 32 are operated by the index finger of the left hand. It will be appreciated that the other characters can be input in this manner. Since the ring 34 of the column selecting means 33 is secured to the thumb and the position of the contact point changes in correspondence to the movement of the hand, it is possible to carry out an inputting operation in the same manner as conventional keyboards.

The illustrated collective keys 32 have an elongated shape, but it is not necessary that the collective keys 32 have the length of the conventional four keys, and it is possible to freely select the length of the collective keys 32 in consideration of the design or appearance. Also, it is preferable that the column selecting means 33 has a construction such that a clicking feeling is obtained when changing contact points so as to recognize the updated contact point.

FIG. 17 shows the matrix arrangement of the keys in the embodiment of FIGS. 16A and 16B. This matrix arrangement is conveniently shown to be identical to that of FIG. 9. Each of the collective keys 32 bears four corresponding characters, as described above, and connected to the terminals of the conductor lines via the selecting switch 35. The character "A" is input by the above described key operation, which causes the conductor line of the number one row and the conductor line of the number three (c) column to be electrically connected, which is identical to FIG. 9. Similarly, the numeral "5" is input by electrical connection between the conductor line of the number five row and the conductor line of the number one (a) column.

FIGS. 18A and 18B show the seventh embodiment of the present invention. Collective keys 32 and column selecting means 33 are provided, as in the previous embodiment. In this embodiment, the column selecting means 33 comprises a roller 37 on the top surface 22a of the armrest 22 and a switch 35 connected to one end of the roller 37. The roller 37 is made from a flexible and frictional material such as rubber or polyvinyl chloride, and is rotatable in forward and reverse directions. The switch 35 has four contact points, as in the previous embodiment. In addition, a home position returning means 38, for example, a returning spring, is provided on the roller 37 for returning the column selecting means 33 to a home position, i.e., the number three contact point.

When inputting the characters, the palm of the hand is placed on the roller 37 and the fingers are placed on the collective keys 32. Under normal conditions, the roller 37 is in a home position, and placing all of the fingers of the left hand on to the collective keys 32 causes the characters, "G", "F", "D", "S", and "A" to be input. When the hand is moved forward and placing the fingers as in the former operation causes the characters, "T", "R", "E", "W" and "Q" to be input.

In this embodiment, when the hand is once released from the roller 37, the roller 37 immediately returns to the home position due to the action of the home position returning means 38 and it is possible to carry out an exact inputting operation.

FIGS. 19A, 19B, 20A and 20B show the eighth embodiment of the present invention. Collective keys 32 and a column selecting means are provided, as in the previous embodiment. In this embodiment, the column selecting means comprises a slide cover 31 such as the one shown in FIGS. 15A and 15B. The column selecting means comprises a cam 39 provided on the lower surface of the cover 31 and three switches 40 to 42 provided on the top surface 22a of the armrest 22 and actuated by the cam 39. In addition, indicating lamps 43 comprising light emitting diodes (LED) are provided adjacent the collective keys 32 for indicating the column selected by the column selecting means.

Figure 20A:
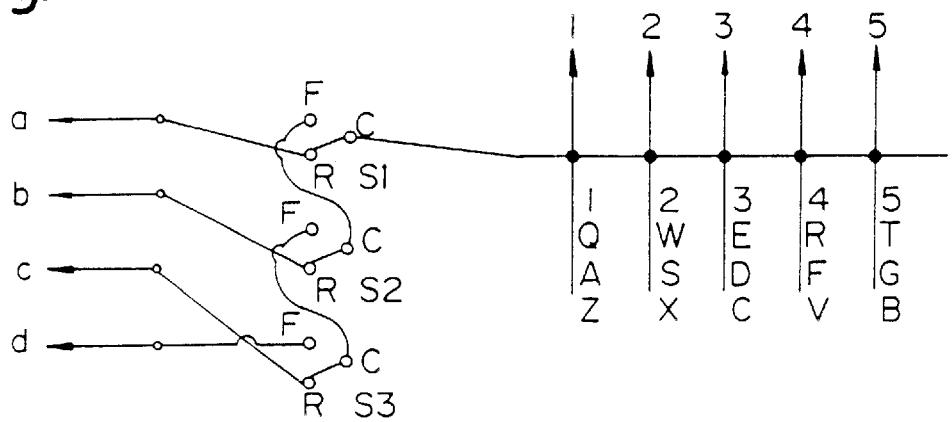
FIG. 20A is a wiring diagram of the matrix arrangement of the keys in the embodiment of FIGS. 19A and 19B.
Figure 20B:
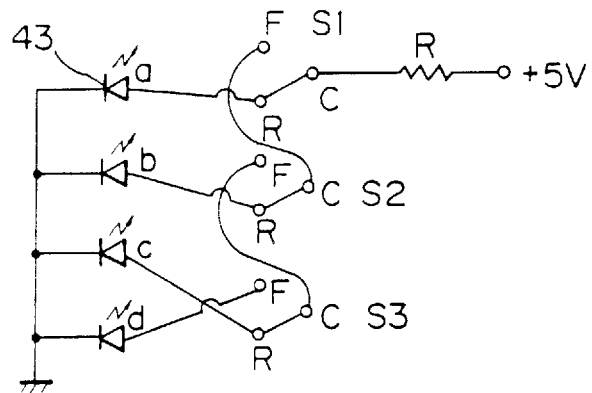
FIG. 20B is a wiring diagram of the column selecting indicating means in the embodiment of FIGS. 19A and 19B.

FIG. 20A shows the wiring diagram of the matrix arrangement in which the switches 40 to 42 of FIGS. 19A and 19B are arranged to select the column of the collective keys 32. FIG. 20B shows the wiring diagram of the selected column indicating lamps 43. In FIGS. 19B, 20A and 20B, the switches 40 to 42 are represented by S1, S2, and S3, respectively. Each of the switches S1, S2, and S3 has a common contact C, a forward contact F, and a reverse contact R. The common contact C and the reverse contact R of the switch S1 are inserted in the conductor line "a", and the forward contact F is connected to the common contact C of the switch S2. The reverse contact R of the switch S2 is connected to the conductor line "b", and the forward contact F is connected to the common contact C of the switch S3. Then, the reverse contact R of the switch S3 is connected to the conductor line "c", and the forward contact F is connected to the conductor line "d".

When the slide cover 31 is pulled up to reveal the collective switches 32, and the cam 39 does not activate the switches S1, S2, and S3, the switches S1, S2, and S3 are OFF such that the common contact C is on the side of the reverse contact R, respectively, as shown in FIGS. 20A and 20B. In this condition, the first column "a" is selected and the LED of the first column emits light.

Then, when the slide cover 31 is pulled slightly, the cam 39 pushes the switch S1 to turn same ON such that the common contact C is on the side of the forward contact F. Now the second column "b" is selected and the LED of the second column emits light. In this manner, the third column (the home position) can be selected by pulling the slide cover 31 slightly and the fourth column can be selected by pulling the slide cover 31. It will be appreciated that the slide cover 31 can be pushed and pulled as will to select a desired column.

As shown in FIG. 19A, an anti-sliding member 44 made from a frictional material such as rubber is preferably arranged on the top surface of the slide cover 31, and a hand is placed on the anti-sliding member 44 to move the slide cover 31.

We claim:

1. A chair comprising a seat having opposite sides, first and second armrests arranged on either side of the seat and fixed to the seat, and a keyboard means arranged in the armrests, wherein:

said keyboard means comprises a first group of keys arranged in the second armrest for operation by the other hand of the operator;

each of the armrests has a top surface, a front surface and side surfaces with at least a larger number of each group of keys being arranged on one of the front surface and the top surface of each armrest than are arranged on the side surfaces; and a larger number of each group of keys are arranged on the front surface of each armrest than are arranged on at least one of the side surfaces of each armrest.

2. A chair according to claim 1, wherein the keys comprise at least alphanumeric keys.

3. A keyboard system comprising:

a main keyboard having a plurality of keys bearing respective characters and arranged in a predetermined pattern for inputting data to an information processing apparatus, and a supplemental keyboard arranged in first and second armrests of a chair and including keys bearing at least one of alphanumeric and symbolic characters identical to those of at least a part of the keys of the main keyboard for inputting data to the information processing apparatus parallel to the main keyboard, wherein both the main keyboard and the supplemental keyboard are in an active condition at the same time so that either the main keyboard or the supplemental keyboard may be used to enter data, each of the first and second armrests has a top surface, a front surface, an inner side surface, and an outer side surface, and a majority of the keys is arranged on the front surface or the top surface of each armrest, and a minority of the keys is arranged in at least one of the side surfaces of each armrest.

4. A chair according to claim 3, wherein the keys of the main keyboard comprise alphanumeric keys, shift keys, a space key and control keys, and the keys of the supplemental keyboard means comprise at least alphanumeric keys.

5. A keyboard system according to claim 4, wherein the keys of the supplemental keyboard means comprise a first group of keys arranged in the first armrest for operation by one of the hands of an operator, and a second group of keys arranged in the second armrest for operation by the other hand of the operator.

6. A keyboard system comprising:

a main keyboard having a plurality of keys bearing respective characters and arranged in a predetermined pattern for inputting data to an information processing apparatus, and a supplemental keyboard arranged in first and second armrests of a chair and including keys bearing at least one of alphanumeric and symbolic characters identical to those of at least a part of the keys of the main keyboard for inputting data to the information processing apparatus parallel to the main keyboard, wherein both the main keyboard and the supplemental keyboard are in an active condition at the same time so that either the main keyboard or the supplemental keyboard may be used to enter data, each of the first and second armrests has a top surface, a front surface, an inner side surface, and an outer side surface, and a majority of the keys is arranged on the front surface or the top surface of each armrest, and a minority of the keys is arranged in at least one of the side surfaces of each armrest.

7. A keyboard system according to claim 6, wherein the keys of the main keyboard are connected to a matrix of rows of conductors and columns of conductors, and the keys of the supplemental keys of the supplemental keyboard means are connected to a matrix of rows of conductors and columns of conductors similar to those of the main keyboard; the rows of conductors and columns of conductors of the supplemental keyboard means connectable to the rows of conductors and columns of conductors of the matrix of the main keyboard, respectively.

8. A keyboard system according to claim 7, wherein the main keyboard further comprises an electronic signal processing circuit means receiving signals from the rows of conductors and columns of conductors of the main keyboard; the rows of conductors and columns of conductors of the supplemental keyboard means being connected to the electronic signal processing circuit means parallel to the rows of conductors and columns of conductors of the main keyboard.

9. A keyboard system according to claim 3, wherein the front surface is inclined to the top surface, and a majority of each group of keys are arranged in the inclined front surface.

10. A keyboard system according to claim 3, wherein, first, at least one key is arranged on the outer side surface of each armrest for operation by the little finger of an operator.

11. A keyboard system according to claim 10, wherein at least one control and function key is arranged on the outer side surface of each armrest on the side of at least one key remote from the keys on one of the front surface and the top surface of the armrest, with at least one control key having a height greater than that of said at least one key operated by the little finger.

12. A keyboard system according to claim 9, wherein at least one control key is arranged at or adjacent to a corner between the top surface and one of the side surfaces of the armrest for operation by the palm of a hand near the thumb or the little finger, the at least one control key being simultaneously operated with another key.

13. A keyboard system according to claim 3, wherein a pointing device is further arranged on one of the armrests.

14. A keyboard system according to claim 13, wherein the pointing device comprises at least one of a trackball and a pair of rollers arranged perpendicular to each other.

15. A keyboard system according to claim 14, wherein a click button is provided in one of the side surfaces for transferring the decision of an operator to an information processing apparatus during operation of the pointing device.

16. A keyboard system according to claim 3, wherein the keys arranged in the armrest are covered by a cover.

17. A keyboard system according to claim 3, wherein the keys arranged on the armrest comprise collective keys associated with a column selecting means; each of the collective keys bearing a plurality of characters in correspondence with those of a plurality of keys in one column of the main keyboard with the column selecting means selecting one of the characters.

18. A keyboard system according to claim 17, wherein the column selecting means comprises a ring securable around a thumb of an operator, a selecting switch, and a connecting member interconnecting the ring and the selecting switch.

19. A keyboard system according to claim 17, wherein the column selecting means comprises a roller arranged on the top surface of the armrest.

20. A keyboard system according to claim 17, wherein a home position returning means is provided for returning the column selecting means to a home position.

21. A keyboard system according to claim 17, wherein the column selecting means comprises a slide cover covering the top surface of the armrest, a cam movable with the slide cover, and selecting switches actuated by the cam.

22. A keyboard system according to claim 21, wherein the slide cover has a top surface to which anti-sliding material is applied.

23. A keyboard system according to claim 17, wherein an indicating means for indicating a column selected by the column selecting means is provided.

24. A keyboard system comprising a main keyboard having a plurality of keys bearing respective characters and arranged in a predetermined pattern for inputting data to an information processing apparatus, and a supplemental keyboard means arranged in the armrests of a chair and including keys bearing characters identical to those of at least a part of the keys of the main keyboard for inputting data to the information processing apparatus parallel to the main keyboard, wherein the keys of the main keyboard comprise alphanumeric keys, shift keys, a space key and control keys, and the keys of the supplemental keyboard means comprise at least alphanumeric keys; and wherein each armrests of the chair has a top surface, a front surface, an inner side surface and an outer side surface, and a majority of each group of keys are arranged on the front surface or the top surface of each armrest, and a minority of each group of keys are arranged in at least one of the side surfaces of each armrest.

25. A keyboard system comprising a main keyboard having a plurality of keys bearing respective characters and arranged in a predetermined pattern for inputting data to an information processing apparatus, and a supplemental keyboard means arranged in the armrests of a chair and including keys bearing characters identical to those of at least a part of the keys of the main keyboard for inputting data to the information processing apparatus parallel to the main keyboard, wherein a pointing device is further arranged on one of the armrests;

wherein the pointing device comprises at least one of a trackball and a pair of rollers arranged perpendicular to each other; and wherein a click button is provided in one of the side surfaces for transferring the decision of an operator to an information processing apparatus during operation of the point device.

* * * * *

UNITED STATES PATENT AND TRADEMARK OFFICE
CERTIFICATE OF CORRECTION

PATENT NO. : 5,818,357
DATED : October 6, 1998
INVENTOR(S) : Hideyuki MOTOYAMA et al.

It is certified that error appears in the above-identified patent and that said Letters Patent is hereby corrected as shown below:

On the Title Page, Col. 2, insert the following:

OTHER REFERENCES

*IBM TECHNICAL DISCLOSURE BULLETIN*, Vol. 29, No. 9, "PC Keyboard Protective Shield," February 9, 1987, New York, NY, page 3808.

Col. 12, lines 10-31, please delete claim 6 in its entirety and substitute therefore the following new claim 6 (previously claim 8):

6. A keyboard system according to claim 3, wherein the keys of the main keyboard comprise a first group of keys arranged in a first matrix pattern and a second group of keys arranged in a second matrix pattern, and the keys of the supplemental keyboard comprises a first group of keys arranged in the first armrest and a second group of keys arranged in the second armrest, said first group of keys of the supplemental keyboard bearing characters identical to those of said first group of keys of the main keyboard and arranged in a matrix pattern identical to said first matrix pattern, said second group of keys of the supplemental keyboard bearing characters identical to those of said second group of keys of said main keyboard and arranged in a matrix pattern identical to said second matrix pattern.

Signed and Sealed this

Twenty-third Day of March, 1999

*Attest:*

Q. TODD DICKINSON

*Attesting Officer*   *Acting Commissioner of Patents and Trademarks*